United States Patent
Komatsu et al.

(10) Patent No.: US 9,606,336 B2
(45) Date of Patent: Mar. 28, 2017

(54) ZOOM LENS AND IMAGING APPARATUS

(71) Applicant: FUJIFILM Corporation, Tokyo (JP)

(72) Inventors: Daiki Komatsu, Saitama-ken (JP); Nobuaki Toyama, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 219 days.

(21) Appl. No.: 14/328,782

(22) Filed: Jul. 11, 2014

(65) Prior Publication Data

US 2015/0015969 A1 Jan. 15, 2015

(30) Foreign Application Priority Data

Jul. 12, 2013 (JP) .................. 2013-146209

(51) Int. Cl.
- *G02B 15/17* (2006.01)
- *G02B 15/173* (2006.01)
- *G02B 15/167* (2006.01)

(52) U.S. Cl.
CPC .......... *G02B 15/17* (2013.01); *G02B 15/167* (2013.01); *G02B 15/173* (2013.01)

(58) Field of Classification Search
CPC .... G02B 15/14; G02B 15/163; G02B 15/167; G02B 15/17
USPC ......................... 359/687–688, 684
See application file for complete search history.

(56) References Cited

U.S. PATENT DOCUMENTS

| | | | |
|---|---|---|---|
| 5,757,554 A | 5/1998 | Fukami | |
| 5,808,809 A | 9/1998 | Yahagi | |
| 6,545,818 B2 * | 4/2003 | Usui | G02B 15/173 359/683 |
| 7,505,213 B2 * | 3/2009 | Tsutsumi | G02B 15/173 359/684 |
| 8,300,320 B2 | 10/2012 | Kodaira | |
| 8,570,662 B2 * | 10/2013 | Eguchi | G02B 15/17 348/340 |
| 8,879,164 B2 * | 11/2014 | Hori | G02B 15/173 359/683 |
| 8,988,786 B2 * | 3/2015 | Shimomura | G02B 15/173 359/683 |
| 9,001,433 B2 * | 4/2015 | Toyama | G02B 13/18 359/686 |

(Continued)

FOREIGN PATENT DOCUMENTS

| | | |
|---|---|---|
| JP | 09-15501 | 1/1997 |
| JP | 10-31157 | 2/1998 |

(Continued)

OTHER PUBLICATIONS

Geary, Joseph M. Introduction to Lens Design: With Practical ZEMAX Examples. Richmond, VA: Willmann-Bell, 2002. 23. Print.*

Japanese Official Action—2013-146209—Aug. 16, 2016.

*Primary Examiner* — Zachary Wilkes
(74) *Attorney, Agent, or Firm* — Young & Thompson

(57) ABSTRACT

A zoom lens includes: a first lens group having a positive refractive power which is fixed while changing magnification; two or more movable lens groups that move independently from each other while changing magnification; and a final lens group having a positive refractive power which is fixed while changing magnification, provided in this order from an object side. The zoom lens satisfying Conditional Formula (1) below:

$$1.30 < h/(Yimg \cdot \tan \theta) < 2.37 \qquad (1).$$

19 Claims, 16 Drawing Sheets

(56) References Cited

U.S. PATENT DOCUMENTS

| | | | | |
|---|---|---|---|---|
| 9,025,255 | B2 * | 5/2015 | Toyama | ............... G02B 15/177 359/688 |
| 9,170,406 | B2 * | 10/2015 | Toyama | ................ G02B 15/14 |
| 2012/0002300 | A1 | 1/2012 | Kodaira | |
| 2014/0320977 | A1 | 10/2014 | Yakita | |

FOREIGN PATENT DOCUMENTS

| JP | 2004-341238 | 12/2004 |
|---|---|---|
| JP | 2012-013817 | 1/2012 |
| JP | 2013-7898 | 1/2013 |
| JP | 2013-73196 | 4/2013 |
| JP | 2014-232313 | 12/2014 |
| WO | 2013/065299 | 5/2013 |

* cited by examiner

FIG.4
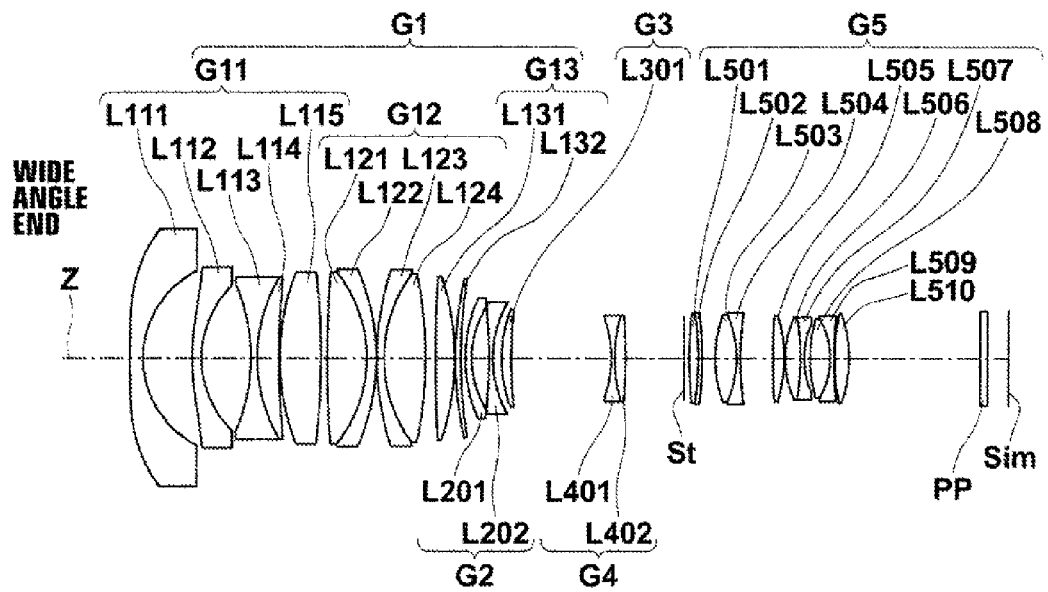
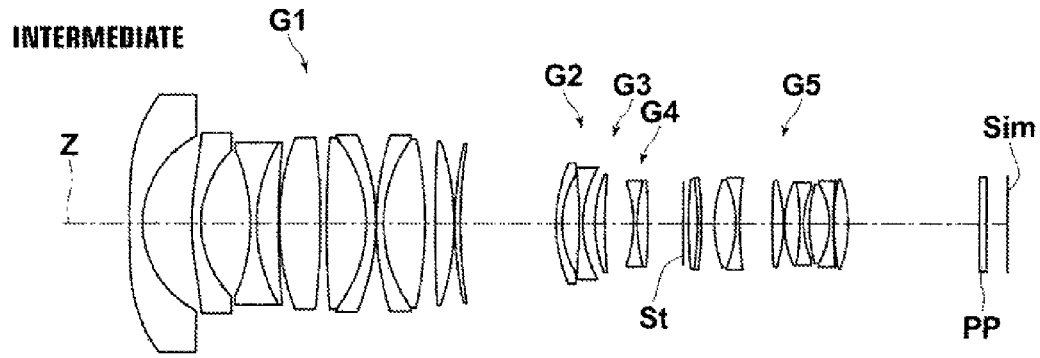
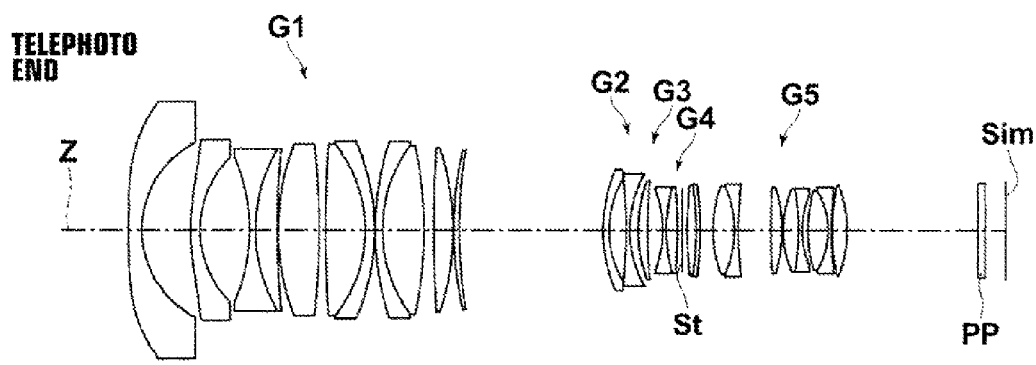

FIG.9
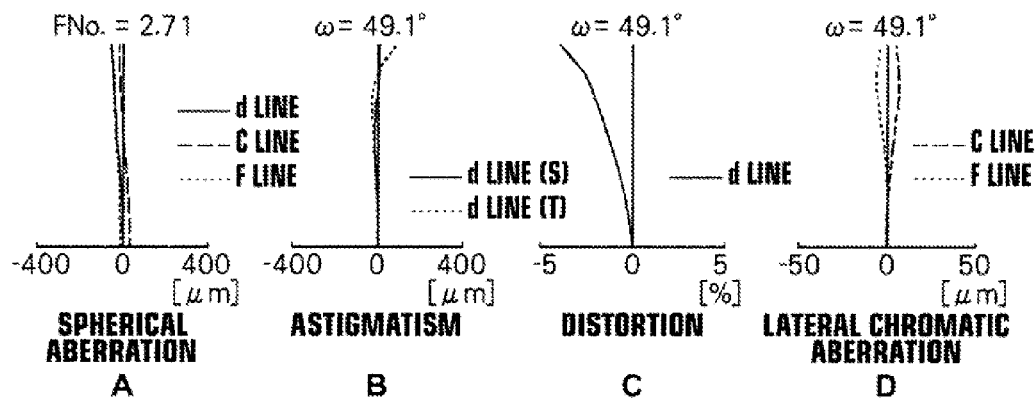
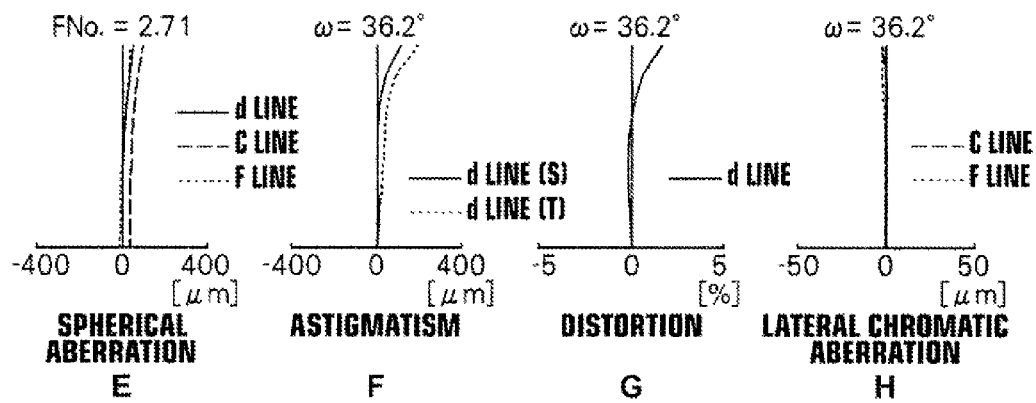
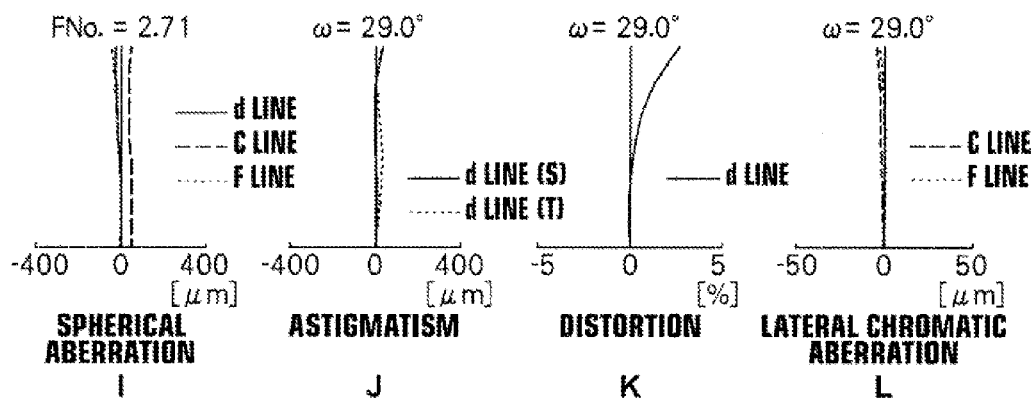

FIG.11
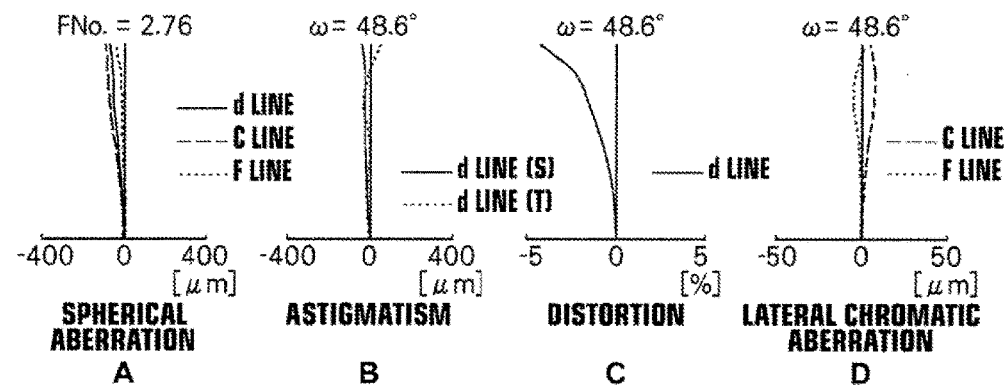
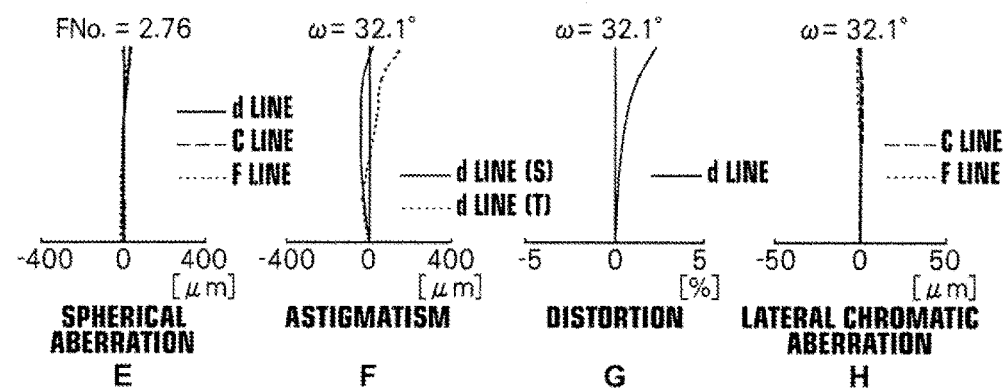
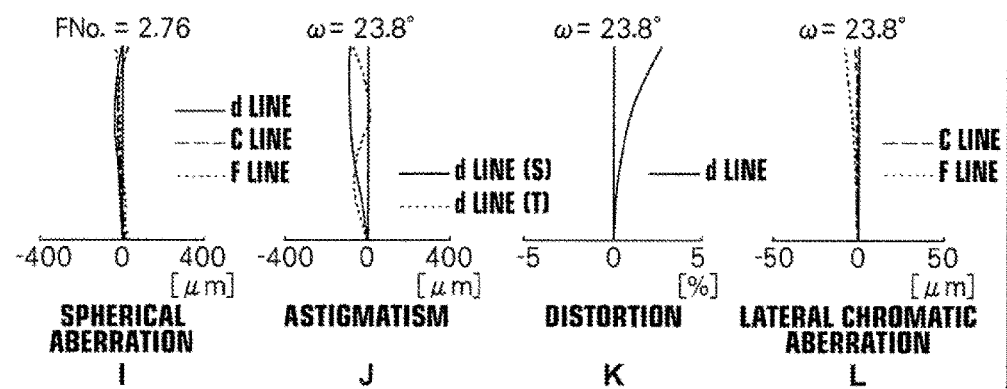

FIG.13
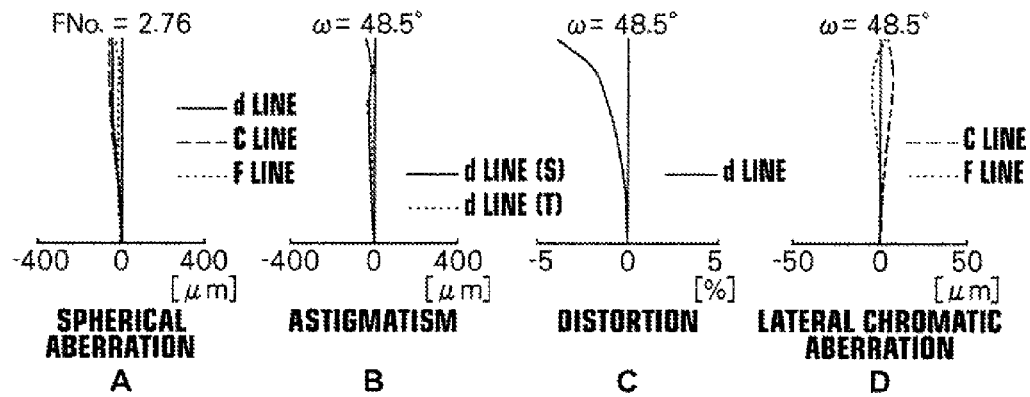
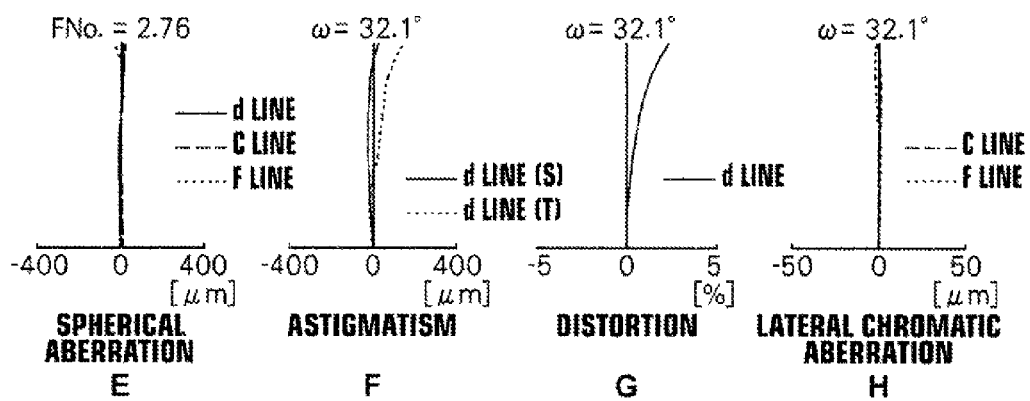
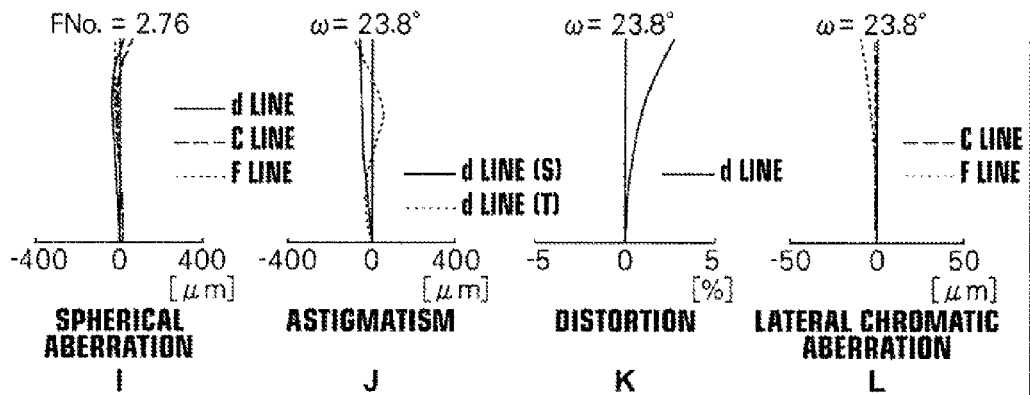

ZOOM LENS AND IMAGING APPARATUS

CROSS REFERENCE TO RELATED APPLICATIONS

The present application claims priority under 35 USC §119 to Japanese Patent Application No. 2013-146209, filed on Jul. 12, 2013. The above application is hereby expressly incorporated by reference in its entirety, into the present application.

TECHNICAL FIELD

The present invention is related to a zoom lens for use in electronic cameras such as a digital camera, a video camera, a broadcast camera, a cinematic camera, and a surveillance camera. The present invention is also related to an imaging apparatus equipped with the zoom lens.

BACKGROUND ART

Wide angle zoom lenses for use in electronic cameras, and particularly, wide angle zoom lenses for use in broadcast cameras, are disclosed in Japanese Unexamined Patent Publication Nos. 9(1997)-015501 and 2012-013817. However, there are not many known wide angle zoom lenses for use in cinematic cameras, which have larger imaging elements than those of broadcast cameras.

In addition, the number of pixels in imaging elements for cinematic cameras is increasing. However, there are not many known high performance zoom lenses which are compatible with such imaging elements. Japanese Unexamined Patent Publication No. 10 (1998)-031157 discloses a high performance zoom lens having a five group configuration for use in broadcast cameras.

DISCLOSURE OF THE INVENTION

However, it cannot be said that the first lens group of the zoom lenses disclosed in Japanese Unexamined Patent Publication Nos. 9(1997)-015501, 2012-013817, and 10(1998)-031157 are sufficiently miniaturized, although the image sizes thereof are rot overly large. Particularly in recent years, imaging styles have become varied, demand for portable zoom lenses is increasing, and lenses which are compact and lightweight in view of large mage sizes are desired. Particularly, wide angle zoom lenses, which have not yet been proposed, are desired.

The present invention has been developed in view of the foregoing circumstances. It is an object of the present invention is to provide a compact, light weight, and high performance zoom lens that has a wide angle of view. It is another object of the present invention to provide an imaging apparatus equipped with such a zoom lens.

A first zoom lens of the present invention comprises:
a first lens group having a positive refractive power which is fixed while changing magnification;
two or more movable lens groups that move independently from each other while changing magnification; and
a final lens group having a positive refractive power which is fixed while changing magnification, provided in this order from an object side;
the zoom lens satisfying Conditional Formula (1) below.

$$1.30 < h/(Y\text{img} \cdot \tan \theta) < 2.37 \qquad (1)$$

wherein h is the height at which a chief ray of light having a maximum image height enters a first surface at a wide angle end, Yimg is the maximum image height, and θ is the half angle of view at the wide angle end.

Here, it is preferable for the first lens group to comprise a 11 lens group having a negative refractive power, a 12 lens group having a positive refractive power, and a 13 lens group having a positive refractive power; and for the 12 lens group to move to perform focusing operations.

A second zoom lens of the present invention comprises:
a first lens group having a positive refractive power which is fixed while changing magnification;
two or more movable lens groups that move independently from each other while changing magnification; and
a final lens group having a positive refractive power which is fixed while changing magnification, provided in this order from an object side;
the first lens group comprising a 11 lens group having a negative refractive power, a 12 lens group having a positive refractive power, and a 13 lens group having a positive refractive power;
the 12 lens group moving to perform focusing operations; and
the zoom lens satisfying Conditional Formula (2) below.

$$1.530 < n1a < 1.670 \qquad (2)$$

wherein n1a is the average refractive index of the 11 lens group with respect to the d line.

In the first and second zoom lenses, the movable lens groups may be a second lens group having a negative refractive power and a third lens group having a negative refractive power, provided in this order from the object side. Alternatively, the movable lens groups may be a second lens group having a negative refractive power, a third lens group having a positive refractive power, and a fourth lens group having a negative refractive power, provided in this order from the object side.

In addition, it is preferable for Conditional Formula (3) below to be satisfied.

$$1.95 < f13/f1 < 3.00 \qquad (3)$$

wherein f1 is the focal length of the first lens group, and f13 is the focal length of the 13 lens group.

In addition, it is preferable for Conditional Formula (4) below to be satisfied.

$$-2.20 < f11/Y\text{img} < -1.50 \qquad (4)$$

wherein f11 is the focal length of the 11 lens group, and Yimg is a maximum image height.

In addition, it is preferable for the 12 lens group to comprise two pairs of cemented lenses.

In addition, it is preferable for the two pairs of cemented lenses of the 12 lens group to be a cemented lens formed by a positive lens and a negative lens, and a cemented lens formed by a negative lens and a positive lens, provided in this order from the object side.

In addition, it is preferable for the surface most toward the object side within the first lens group and the surface toward the object side of the lens second from the object side to be aspherical.

In addition, it is preferable for Conditional Formula (1-1) below to be satisfied.

$$1.70 < h/(Y\text{img} \cdot \tan \theta) < 2.37 \qquad (1\text{-}1)$$

In addition, it is preferable for Conditional Formula (2-1) below to be satisfied.

$$1.530 < n1a < 1.665 \qquad (2\text{-}1)$$

In addition, it is preferable for Conditional Formula (3-1) to be satisfied, and more preferable for Conditional Formula (3-2) to be satisfied.

$$2.10 < f3/f1 < 2.90 \qquad (3\text{-}1)$$

$$2.20 < f3/f1 < 2.80 \qquad (3\text{-}2)$$

In addition, it is preferable for Conditional Formula (4-1) to be satisfied, and more preferable for Conditional Formula (4-2) to be satisfied.

$$-2.10 < f1/Yimg < -1.60 \qquad (4\text{-}1)$$

$$-2.00 < f1/Yimg < -1.65 \qquad (4\text{-}2)$$

An imaging apparatus of the present invention is characterized by being equipped with the zoom lens of the present invention.

Note that the expression "comprises" means that the zoom lens of the present invention may also include lenses that practically have no power, optical elements other than lenses such as an aperture stop, a mask, a cover glass, and filters, and mechanical components such as lens flanges, a lens barrel, an imaging element, a camera shake correcting mechanism, etc., in addition to the lens groups which have been listed as constituent elements.

In addition, the surface shapes of lenses as well as the signs of the refractive powers of lenses are considered in the paraxial region for lenses that include aspherical surfaces.

The first zoom lens of the present invention comprises the first lens group having a positive refractive power which is fixed while changing magnification; two or more movable lens groups that move independently from each other while changing magnification; and the final lens group having a positive refractive power which is fixed while changing magnification, provided in this order from an object side. In addition, the first zoom lens of the present invention satisfies Conditional Formula (1) below. Therefore, it becomes possible to realize a compact, lightweight, and high performance zoom lens having a wide angle of view.

$$1.30 < h/(Yimg \cdot \tan \theta) < 2.37 \qquad (1)$$

The second zoom lens of the present invention comprises: the first lens group having a positive refractive power which is fixed while changing magnification; two or more movable lens groups that move independently from each other while changing magnification; and the final lens group having a positive refractive power which is fixed while changing magnification, provided in this order from an object side. The first lens group comprises a 11 lens group having a negative refractive power, a 12 lens group having a positive refractive power, and a 13 lens group having a positive refractive power, and the 12 lens group moves to perform focusing operations. In addition, the zoom lens satisfies Conditional Formula (2) below. Therefore, it becomes possible to realize a compact, lightweight, and high performance zoom lens having a wide angle of view.

$$1.530 < n1a < 1.670 \qquad (2)$$

The imaging apparatus of the present invention is equipped with the zoom lens of the present invention. Therefore, the imaging apparatus can be designed to be compact and lightweight, is capable of imaging with a wide angle of view, and can obtain video having high image quality.

BRIEF DESCRIPTION OF THE DRAWINGS

FIG. 4 is a collection of sectional diagrams that illustrate the configuration of a zoom lens according to Example 3.

FIG. 9 is a collection of diagrams (A through L) that illustrate aberrations of the zoom lens of Example 1.

FIG. 11 is a collection of diagrams (A through L) that illustrate aberrations of the zoom lens of Example 3.

FIG. 13 is a collection of diagrams (A through L) that illustrate aberrations of the zoom lens of Example 5.

BEST MODE FOR CARRYING OUT THE INVENTION

Figure 1:
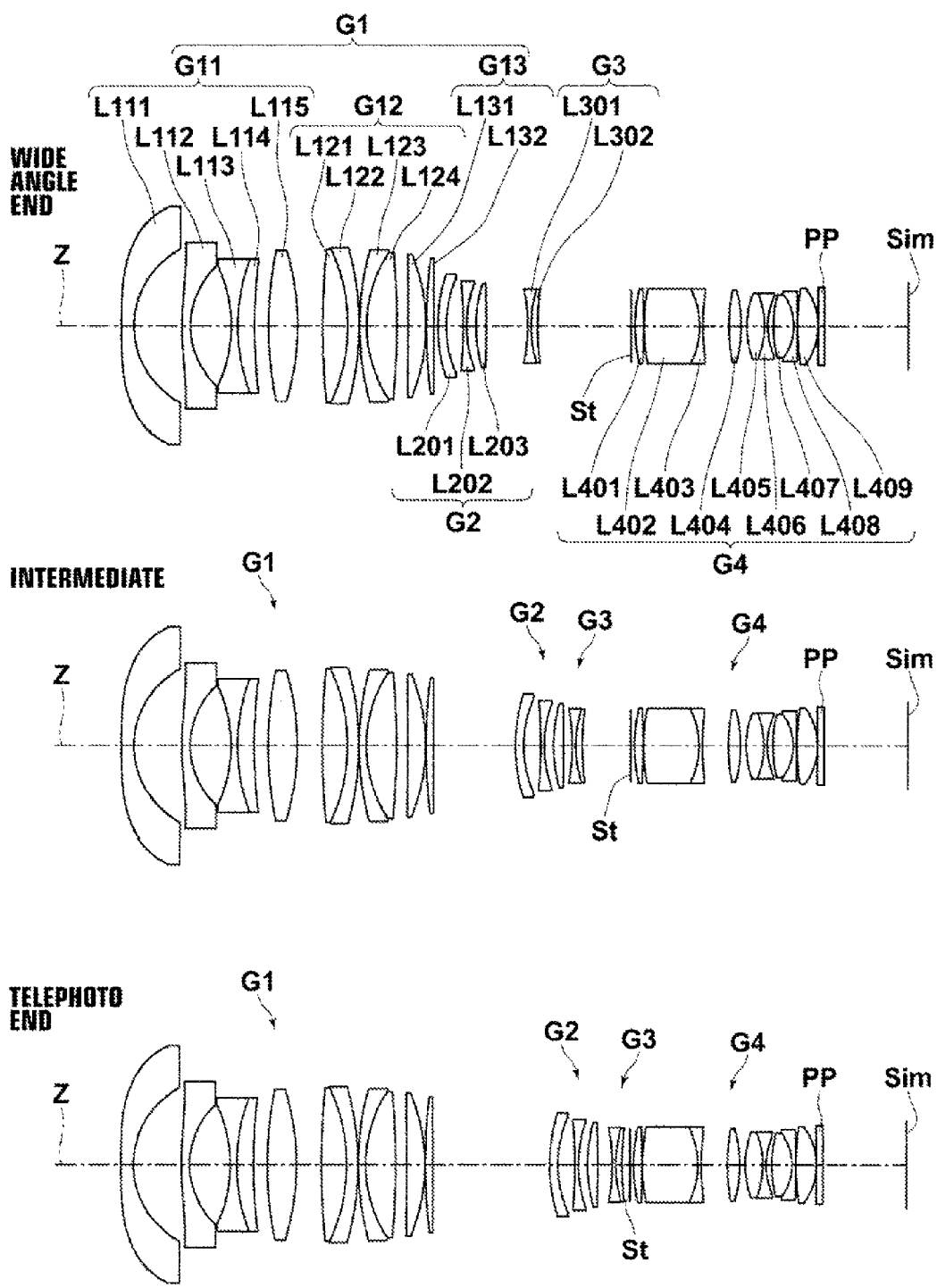
FIG. 1 is a collection of sectional diagrams that illustrate a first example of the configuration of a zoom lens according to an embodiment of the present invention (which is common with Example 1).
Figure 2:
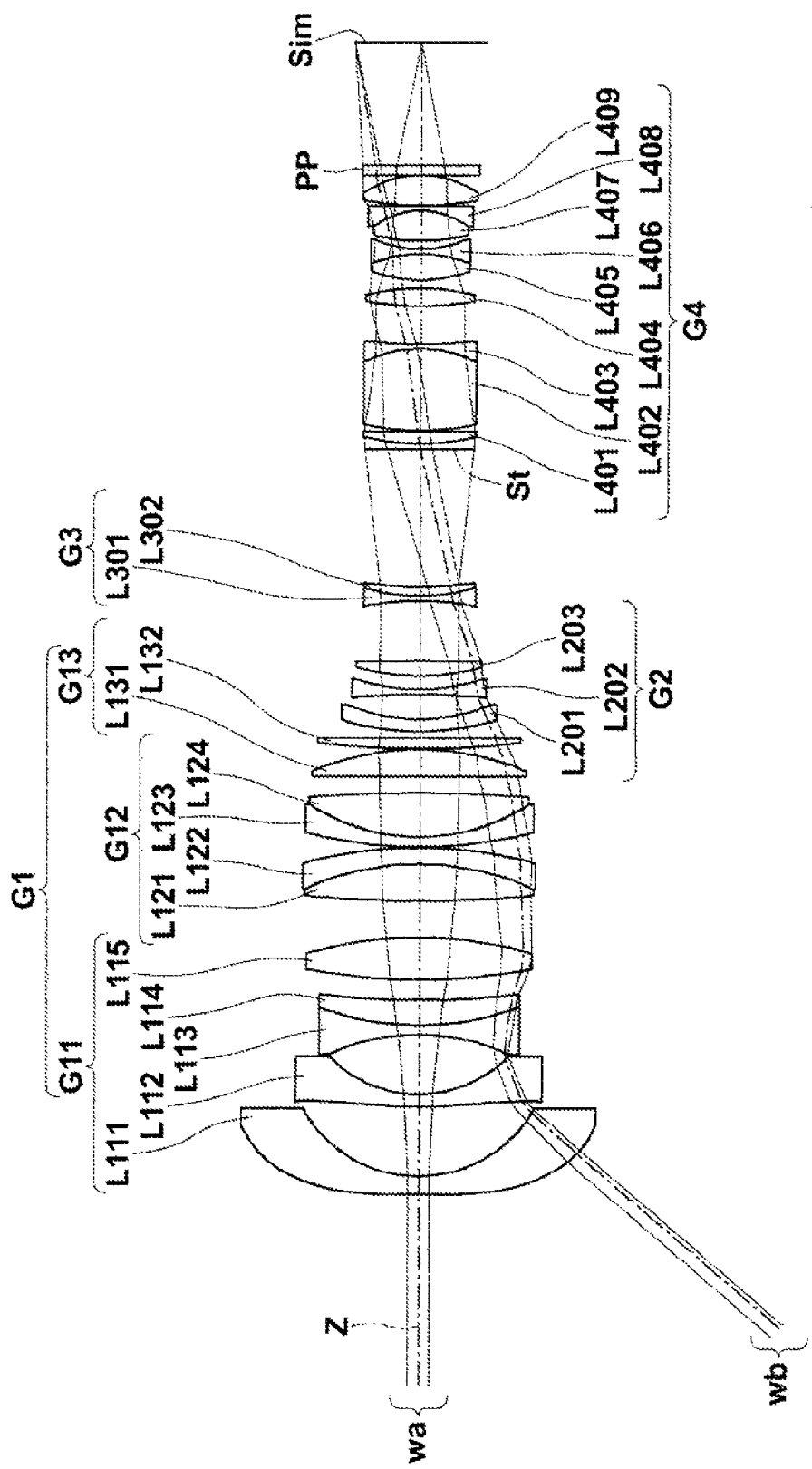
FIG. 2 is a diagram that illustrates the paths of light rays that pass through the zoom lens according to the embodiment of the present invention (which is common with Example 1).

Hereinafter, embodiments of the present invention will be described in detail with reference to the attached drawings. FIG. 1 is a collection of sectional diagrams that illustrate the configuration of a zoom lens according to an embodiment of the present invention. FIG. 2 is a diagram that illustrates the paths of light rays that pass through the lens of FIG. 1. The example of the configuration illustrated in FIG. 1 and FIG. 2 is the same as the configuration of a zoom lens of Example 1 to be described later. In FIG. 1 and FIG. 2, the left side is the object side and the right side is the image side. In addition, FIG. 2 illustrates an axial light beam wa and a light beam wb at a maximum angle of view.

As illustrated in FIG. 1 and FIG. 2. This zoom lens is constituted by a first lens group G1 having a positive refractive power which is fixed while changing magnification, two or more movable lens groups (a second lens group G2 and a third lens group G3 in the present embodiment) that move independently from each other while changing magnification, an aperture stop St, and a final lens group (a fourth lens group G4 in the present embodiment) having a positive refractive power which is fixed while changing magnification, provided in this order along an optical axis Z from the object side. Note that the aperture stop St does not necessarily represent the size or the shape thereof, but the position thereof along the optical axis Z.

When this zoom lens is applied to an imaging apparatus, it is preferable for a cover glass, a prism, and various filters, such as an infrared cutoff filter and a low pass filter, to be provided between the optical system and an imaging surface Sim, depending on the configuration of the camera to which the lens is mounted. Therefore, FIG. 1 and FIG. 2 illustrate an example in which a plane parallel plate shaped optical member PP that presumes such filters is provided between the lens system and the imaging surface Sim.

The first lens group G1 comprises a 11 lens group G11 having a negative refractive power, a 12 lens group G12 having a positive refractive power, and a 13 lens group G13, provided in this order from the object side. The 12 lens group G12 is configured to move to perform focusing operations. By adopting such a configuration, variations in the angle of view due to focusing operations can be suppressed.

In addition, the zoom lens is configured to satisfy Conditional Formula (1) below. By the value of h/(Yimg·tan θ) not exceeding the upper limit defined in Conditional Formula (1), the diameter of the 11 lens group G11 can be prevented from becoming excessively large, which contributes to miniaturization and a reduction in weight. In addition, a configuration in which the value of h/(Yimg·tan θ) is not less than the lower limit defined in Conditional Formula (1) is advantageous from the viewpoint of correcting field curvature and distortion. Note that more favorable properties can be achieved if the zoom lens satisfies Conditional Formula (1-1) below.

$$1.30 < h/(Yimg \cdot \tan \theta) < 2.37 \quad (1)$$

$$1.70 < h/(Yimg \cdot \tan \theta) < 2.37 \quad (1\text{-}1)$$

wherein h is the height at which a chief ray of light having a maximum image height enters a first surface at a wide angle end, Yimg is the maximum image height, and θ is the half angle of view at the wide angle end.

In addition, the zoom lens is configured to satisfy Conditional Formula (2) below. By the value of n1a not exceeding the upper limit defined in Conditional Formula (2), the specific weight of glass materials can be prevented from becoming excessively large, which contributes to a reduction in weight. In addition, a configuration in which the value of n1a is not less than the lower limit defined in Conditional Formula (2) is not only advantageous from the viewpoint of correcting field curvature and lateral chromatic aberration, but also can prevent the outer diameter and the thickness of the 11 lens group G11 from becoming excessively large, which contributes to miniaturization and a reduction in weight. Note that more favorable properties car, be achieved if the zoom lens satisfies Conditional Formula (2-1) below.

$$1.530 < n1a < 1.670 \quad (2)$$

$$1.530 < n1a < 1.665 \quad (2\text{-}1)$$

wherein n1a is the average refractive index of the 11 lens group with respect to the d line.

In the zoom lens of the present embodiment, an example is being described in which the second lens group G2 having a negative refractive power and the third lens group G3 having a negative refractive power, provided in this order from the object side, are the movable lens groups. Alternatively, the zoom lens having a five group configuration as a whole, in which the movable lens groups are a second lens group having a negative refractive power, a third lens group having a positive refractive power, and a fourth lens group having a negative refractive power, provided in this order from the object side.

In addition, it is preferable for Conditional Formula (3) below to be satisfied. A configuration in which the value of f13/f1 does not exceed the upper limit defined in Conditional Formula (3) is not only advantageous from the viewpoint of correcting spherical aberration and field curvature, but also advantageous from the viewpoint of correcting spherical aberration and field curvature during focusing operations, and further can suppress variations in the angle of view during focusing operations. In addition, by the value of f13/f1 is not less than the lower limit defined in Conditional Formula (3), variations in the angle of view during focusing operations can be decreased, and the amount of movement necessary to perform focusing operations can be prevented from becoming excessively large, which contributes to miniaturization and a reduction in weight. Note that more favorable properties can be achieved if the zoom lens satisfies Conditional Formula (3-1) below, and more preferably Conditional Formula (3-2) below.

$$1.95 < f13/f1 < 3.00 \quad (3)$$

$$2.10 < f13/f1 < 2.90 \quad (3\text{-}1)$$

$$2.20 < f13/f1 < 2.80 \quad (3\text{-}2)$$

wherein f1 is the focal length of the first lens group, and f13 is the focal length of the 13 lens group.

In addition, it is preferable for Conditional Formula (4) below to be satisfied. A configuration in which the value of f11/Yimg does not exceed the upper limit defined in Conditional Formula (4) is not only advantageous from the viewpoint of correcting astigmatism, field curvature, and distortion, but also can prevent the diameters of the 12 lens group G12 and the 13 lens group G13 from becoming excessively large, which contributes to miniaturization and a reduction in weight. In addition, a configuration in which the value of f11/Yimg is not less than the lower limit defined in Conditional Formula (4) is advantageous from the viewpoint of correcting spherical aberration and field curvature. Note that more favorable properties can be achieved if the zoom lens satisfies Conditional Formula (4-1) below, and more preferably Conditional Formula (4-2) below.

$$-2.20 < f11/Yimg < -1.50 \quad (4)$$

$$-2.10 < f11/Yimg < -1.60 \quad (4\text{-}1)$$

$$-2.00 < f11/Yimg < -1.65 \quad (4\text{-}2)$$

wherein f11 is the focal length of the 11 lens group, and Yimg is a maximum image height.

In addition, it is preferable for the 12 lens group to comprise two pairs of cemented lenses. By adopting such a configuration, variations in spherical aberration, longitudinal chromatic aberration, and lateral chromatic aberration during focusing operations can be suppressed.

In this case, it is preferable for the two pairs of cemented lenses of the 12 lens group to be a cemented lens formed by a positive lens and a negative lens, and a cemented lens formed by a negative lens and a positive lens, provided in this order from the object side. Such a configuration is advantageous from the viewpoint of correcting longitudinal chromatic aberration and lateral chromatic aberration.

In addition, it is preferable for the surface most toward the object side within the first lens group and the surface toward the object side of the lens second from the object side to be aspherical. By adopting such a configuration, correction of astigmatism, field curvature, and distortion is facilitated, and such a configuration is also advantageous from the viewpoint of miniaturization.

In the present zoom lens, a specific preferred material of the component provided most toward the object side is glass. Alternatively, a transparent ceramic material may be employed.

In the case that the present zoom lens is to be utilized in an environment in which the zoom lens is likely to be damaged, it is preferable for a protective multiple layer film coating to be administered. Further, a reflection preventing coating may be administered in order to reduce the amount of ghost light during use, in addition to the protective coating.

In addition, FIG. 1 illustrates an example in which the optical member PP is provided between the lens system and the imaging surface Sim. Alternatively, various filters such as low pass filters and filters that cut off specific wavelength bands may be provided among each of the lenses instead of being provided between the lens system and the imaging surface Sim. As a further alternative, coatings that have the same functions as the various filters may be administered on the surfaces of the lenses.

Next, examples of numerical values of the zoom lens of the present invention will be described.

First, the zoom lens of Example 1 will be described. FIG. 1 is a collection of sectional diagrams that illustrate the lens configuration of the zoom lens of Example 1. Note that the optical member PP is also illustrated, the left side is the object side, the right side is the image side, and the aperture stop St in the drawings do not necessarily represent the size or the shape thereof, but the position thereof along the optical axis Z, in FIG. 1 and FIGS. 3 through 8 that correspond to Examples 2 through 7 to be described later.

The zoom lens of Example 1 is constituted by the first lens group G1 having a positive refractive power which is fixed while changing magnification, two the second lens group G2 that moves while changing magnification, the third lens group G3 that moves while changing magnification, and the fourth lens group G4 (final lens group) having a positive refractive power which is fixed while changing magnification.

Basic lens data are shown in Table 1, data related to various items are shown in Table 2, data related to the distances among movable surfaces are shown in Table 3, and aspherical surface coefficients are shown in Table 4, for the zoom lens of Example 1. In the following description, the meanings of the symbols in the tables will be described for Example 1. The meanings of the symbols are basically the same for Examples 2 through 7.

In the lens data of Table 1, ith (i=1, 2, 3, . . . ) lens surface numbers that sequentially increase from the object side to the image side, with the lens surface at the most object side designated as first, are shown in the column Si. The radii of curvature of ith surfaces are shown in the column Ri, the distances between an ith surface and an i+1st surface along the optical axis Z are shown in the column Di. The refractive indices of jth (j=1, 2, 3, . . . ) optical elements that sequentially increase from the object side to the image side, with the optical element at the most object side designated as first, with respect to the d line (wavelength: 587.6 nm) are shown in the column Ndj. The Abbe's numbers of the jth optical element with respect to the d line are shown in the column vdj. The partial dispersion ratios of jth optical elements (j=1, 2, 3, . . . ) that sequentially increase from the object side to the image side, with the optical element at the most object side designated as first, are shown in the column θgFj.

Note that the partial dispersion ratio θgF is represented by the following formula.

$$\theta gF=(Ng-NF)/(NF-NC)$$

wherein Ng is the refractive index with respect to the g line, NF is the refractive index with respect to the F line, and NC is the refractive index with respect to the C line.

Here, the signs of the radii of curvature are positive in cases that the surface shape is convex toward the object side, and negative in cases that the surface shape is convex toward the image side. The aperture stop St and the optical member PP are also included in the basic lens data. Text reading "(aperture stop)" is indicated along with a surface number in the column of the surface numbers at the surface corresponding to the aperture stop. In addition, DD [i] is indicated in the column of the distances for distances that change while changing magnification. In addition, the lowermost value in the column Di is the distance between the surface of the optical member PP toward the image side and the imaging surface Sim.

Table 2 shows the values of the zoom magnification rates of the entire system, the focal lengths f' (mm), the back focus Bf', F values (F No.), the angles of view (2ω), at the wide angle end, at an intermediate position, and at the telephoto end, respectively, as well as the maximum image height at the wide angle end, as the data related to various items.

In the basic lens data, the data related to various items, and the data related to the movable surfaces, am are used as the units for lengths and degrees are used as the units for angles. However, it is possible for optical systems to be proportionately enlarged or proportionately reduced and utilized. Therefore, other appropriate units may be used.

In the lens data of Table 1, the symbol "*" is appended to the surface numbers of aspherical surfaces, and numerical values that represent the paraxial radii of curvature are shown as the radii of curvature of the aspherical surfaces. The data of Table 4 related to aspherical surface coefficients show the surface numbers of the aspherical surfaces and aspherical surface coefficients related to the aspherical surfaces. The aspherical coefficients are the values of coefficients KA and Am (m=3, 4, 5, . . . , 20) in formula (A) below.

$$Zd=C \cdot h^2/\{1+(1-KA \cdot C^2 \cdot h^2)^{1/2}\}+\Sigma Am \cdot h^m \quad (A)$$

wherein: Zd is the depth of the aspherical surface (the length of a normal line from a point on the aspherical surface at a height h to a plane perpendicular to the optical axis in contact with the peak of the aspherical surface), h is height (the distance from the optical axis), C is the inverse of the paraxial radius of curvature, and KA and Am (m= 3, 4, 5, . . . , 20) are aspherical surface coefficients.

TABLE 1

Example 1: Lens Data

| Si (Surface No.) | Ri (Radius of Curvature) | Di (Distance) | Ndi (Refractive Index) | vdj (Abbe's Number) | θg, Fj (Partial Dispersion Ratio) |
|---|---|---|---|---|---|
| *1 | 409.9270 | 4.5006 | 1.58313 | 59.38 | 0.5435 |
| 2 | 31.9478 | 17.0179 | | | |
| *3 | 106.6254 | 2.9991 | 1.74400 | 44.78 | 0.5656 |
| 4 | 30.0422 | 14.4978 | | | |
| 5 | −52.2008 | 2.2991 | 1.65160 | 58.55 | 0.5427 |
| 6 | 67.6585 | 6.1233 | 1.53172 | 48.84 | 0.5631 |
| 7 | 198.7908 | 4.9704 | | | |
| 8 | 139.4689 | 10.3618 | 1.80400 | 46.58 | 0.5573 |
| 9 | −96.4727 | DD [9] | | | |
| 10 | 299.2196 | 8.9693 | 1.51742 | 52.43 | 0.5565 |

TABLE 1-continued

Example 1: Lens Data

| Si (Surface No.) | Ri (Radius of Curvature) | Di (Distance) | Ndi (Refractive Index) | vdj (Abbe's Number) | θg, Fj (Partial Dispersion Ratio) |
|---|---|---|---|---|---|
| 11 | −66.0762 | 3.9994 | 1.84661 | 23.78 | 0.6207 |
| 12 | −106.4066 | 0.1491 | | | |
| 13 | 107.8632 | 2.5000 | 1.88100 | 40.14 | 0.5701 |
| 14 | 48.5554 | 10.7557 | 1.49700 | 81.54 | 0.5375 |
| 15 | −310.8769 | DD [15] | | | |
| 16 | −11732.3504 | 6.5205 | 1.49700 | 81.54 | 0.5375 |
| 17 | −67.8512 | 0.1490 | | | |
| 18 | 193.0989 | 2.6893 | 1.43875 | 94.93 | 0.5343 |
| 19 | 30544.0697 | DD [19] | | | |
| 20 | 62.4444 | 3.0001 | 1.58913 | 61.14 | 0.5407 |
| 21 | 43.1799 | 6.0889 | | | |
| 22 | −176.8246 | 1.1993 | 1.68893 | 31.07 | 0.6004 |
| 23 | 46.0137 | 3.3263 | | | |
| 24 | 55.5904 | 3.6577 | 1.78470 | 26.29 | 0.6136 |
| 25 | −556.6621 | DD [25] | | | |
| 26 | −69.9641 | 1.1991 | 1.60300 | 65.44 | 0.5402 |
| 27 | 44.5306 | 2.3725 | 1.80000 | 29.84 | 0.6018 |
| 28 | 106.1842 | DD [28] | | | |
| 29 (aperture stop) | ∞ | 1.2990 | | | |
| 30 | 61.1821 | 2.9929 | 1.80100 | 34.97 | 0.5864 |
| 31 | −479.0028 | 0.1492 | | | |
| 32 | 67.4770 | 19.7929 | 1.61800 | 63.33 | 0.5441 |
| 33 | −30.4084 | 1.2003 | 1.90366 | 31.32 | 0.5948 |
| 34 | 98.6984 | 9.2684 | | | |
| 35 | 72.3486 | 4.3177 | 1.85002 | 32.40 | 0.5986 |
| 36 | −51.8177 | 2.0606 | | | |
| 37 | 35.2035 | 6.3115 | 1.49700 | 81.54 | 0.5875 |
| 38 | −31.6712 | 1.2010 | 1.88100 | 40.14 | 0.5701 |
| 39 | 26.8368 | 2.0274 | | | |
| 40 | 47.8031 | 7.3291 | 1.48749 | 70.23 | 0.5301 |
| 41 | −18.9526 | 1.1991 | 1.91082 | 35.25 | 0.5822 |
| 42 | 8343.9540 | 0.1502 | | | |
| 43 | 90.6666 | 7.3503 | 1.48749 | 70.23 | 0.5301 |
| 44 | −23.7246 | 0.0000 | | | |
| 45 | ∞ | 2.3000 | 1.51633 | 64.14 | 0.5353 |
| 46 | ∞ | 29.9940 | | | |

TABLE 2

Example 1: Items (related to d line)

| | Wide Angle End | Intermediate | Telephoto End |
|---|---|---|---|
| Zoom Ratio | 1.00 | 1.49 | 1.95 |
| f | 14.203 | 21.162 | 27.695 |
| Bf | 31.510 | 31.510 | 31.510 |
| F No. | 2.71 | 2.71 | 2.71 |
| 2ω [°] | 98.2 | 72.4 | 58.0 |
| h | 38.470 | | |
| Yimg | 15.75 | | |

TABLE 3

Example 1: Zoom Distances

| | Wide Angle End | Intermediate | Telephoto End |
|---|---|---|---|
| DD [9] | 8.921 | 8.921 | 8.921 |
| DD [15] | 3.935 | 3.935 | 3.935 |
| DD [19] | 1.500 | 29.121 | 41.635 |
| DD [25] | 14.635 | 3.103 | 5.194 |
| DD [28] | 33.513 | 17.425 | 2.819 |

TABLE 4

Example 1: Aspherical Surface Coefficients

| Surface No. | 1 | Surface No. | 3 |
|---|---|---|---|
| KA | 1.00000000E+00 | KA | 1.00000000E+00 |
| A3 | −4.62278307E−06 | A4 | −4.86286556E−06 |
| A4 | 6.14778261E−06 | A6 | −8.77554561E−10 |
| A5 | −1.92932204E−08 | A8 | 1.34711999E−11 |
| A6 | −3.67925408E−09 | A10 | −4.96075731E−14 |
| A7 | 3.35087759E−11 | A12 | 1.15033129E−16 |
| A8 | 1.57495428E−12 | A14 | −1.60626594E−19 |
| A9 | 1.17528821E−15 | A16 | 1.22990998E−22 |
| A10 | −4.54994700E−16 | A18 | −4.17694414E−26 |
| A11 | −5.04502281E−18 | A20 | 2.65204259E−30 |
| A12 | −1.45086775E−20 | | |
| A13 | 8.02307748E−22 | | |
| A14 | 4.58656163E−23 | | |
| A15 | 1.06535667E−24 | | |
| A16 | 1.09653575E−26 | | |
| A17 | −2.54537928E−28 | | |
| A18 | −1.34715266E−29 | | |
| A19 | −1.70590216E−31 | | |
| A20 | 8.57519103E−33 | | |

A through L of FIG. 9 are diagrams that illustrate various aberrations of the zoom lens of Example 1. The spherical aberration, the astigmatic aberration, the distortion, and the lateral chromatic aberration of the zoom lens of Example 1 at the wide angle end are illustrated in A through D of FIG. 9, respectively. The spherical aberration, the astigmatic aberration, the distortion, and the lateral chromatic aberration of the zoom lens of Example 1 at an intermediate focal distance are illustrated in E through H of FIG. 9, respectively. The spherical aberration, the astigmatic aberration, the distortion, and the lateral chromatic aberration of the zoom lens of Example 1 at the telephoto end are illustrated in I through L of FIG. 9, respectively.

The diagrams that illustrate spherical aberration, astigmatic aberration, and distortion show aberrations related to the d line (wavelength: 587.6 nm). The diagrams that illustrate spherical aberration show aberrations related to the d line (wavelength: 587.6 nm), aberrations related to the C line (wavelength: 656.3 nm), and aberrations related to the F line (wavelength: 486.1 nm), as solid lines, broken lines, and dotted lines, respectively. In the diagrams that illustrate astigmatic aberrations, aberrations in the sagittal direction are indicated by solid lines, while aberrations in the tangential direction are indicated by dotted lines. In the diagrams that illustrate lateral chromatic aberration, aberrations related to the C: line (wavelength: 656.3 nm) and aberrations related to the F line (wavelength: 486.1 nm) are shown as broken lines and dotted lines, respectively. In the diagrams that illustrate spherical aberrations, "Fno." denotes F values. In the other diagrams that illustrate the aberrations, "ω" denotes half angles of view.

Figure 3:
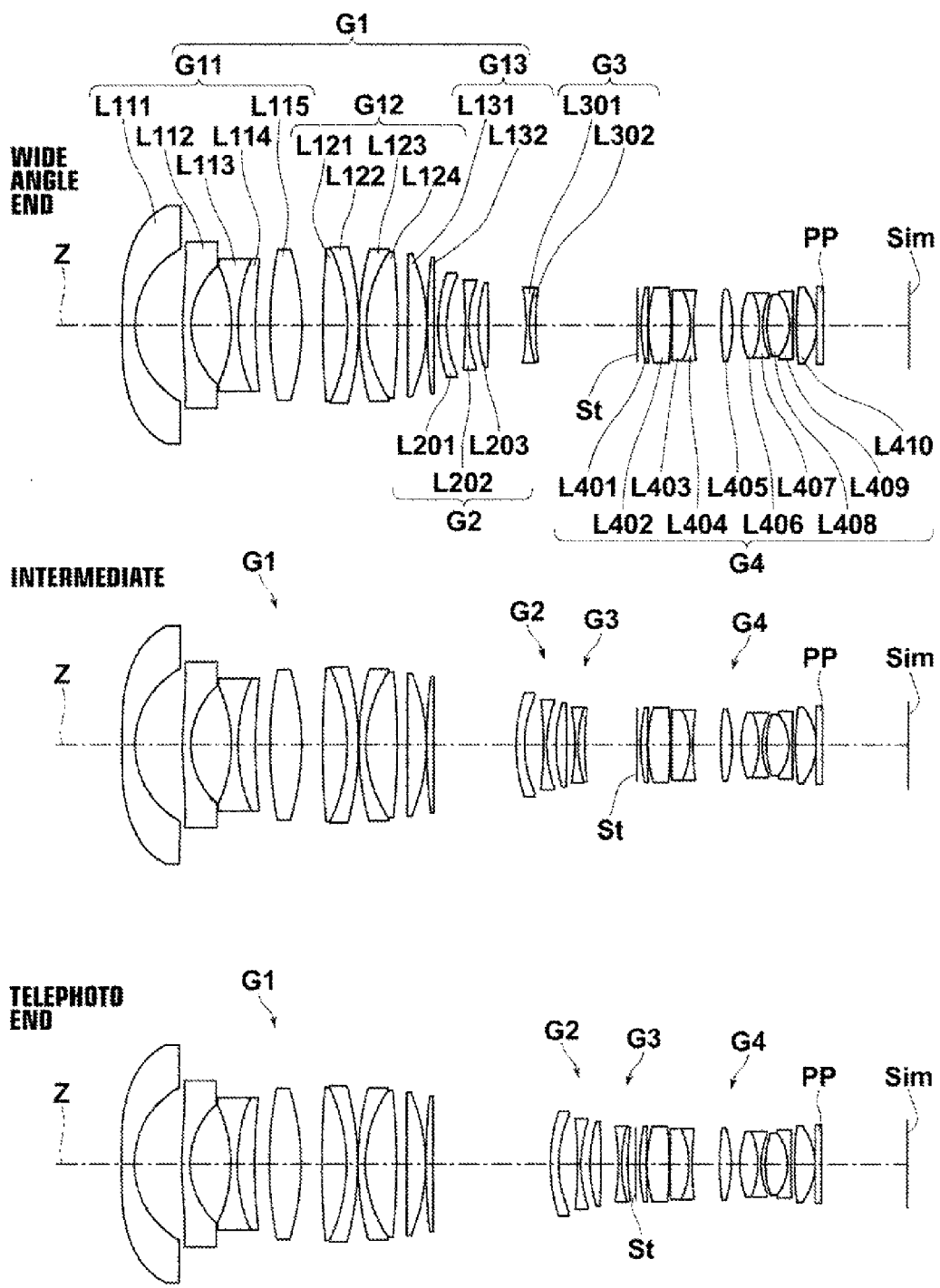
FIG. 3 is a collection of sectional diagrams that illustrate the configuration of a zoom lens according to Example 2.

Next, a zoom lens according to Example 2 will be described. FIG. 3 is a collection of sectional diagrams that illustrate the lens configuration of the zoom lens of Example 2.

The zoom lens of Example 2 is constituted by a first lens group G1 having a positive refractive power which is fixed while changing magnification, a second lens group G2 having a negative refractive power which moves while changing magnification, a third lens group G3 having a negative refractive power which moves while changing magnification, and a fourth lens group G4 (final lens group) having a positive refractive power which is fixed while changing magnification.

Figure 10:
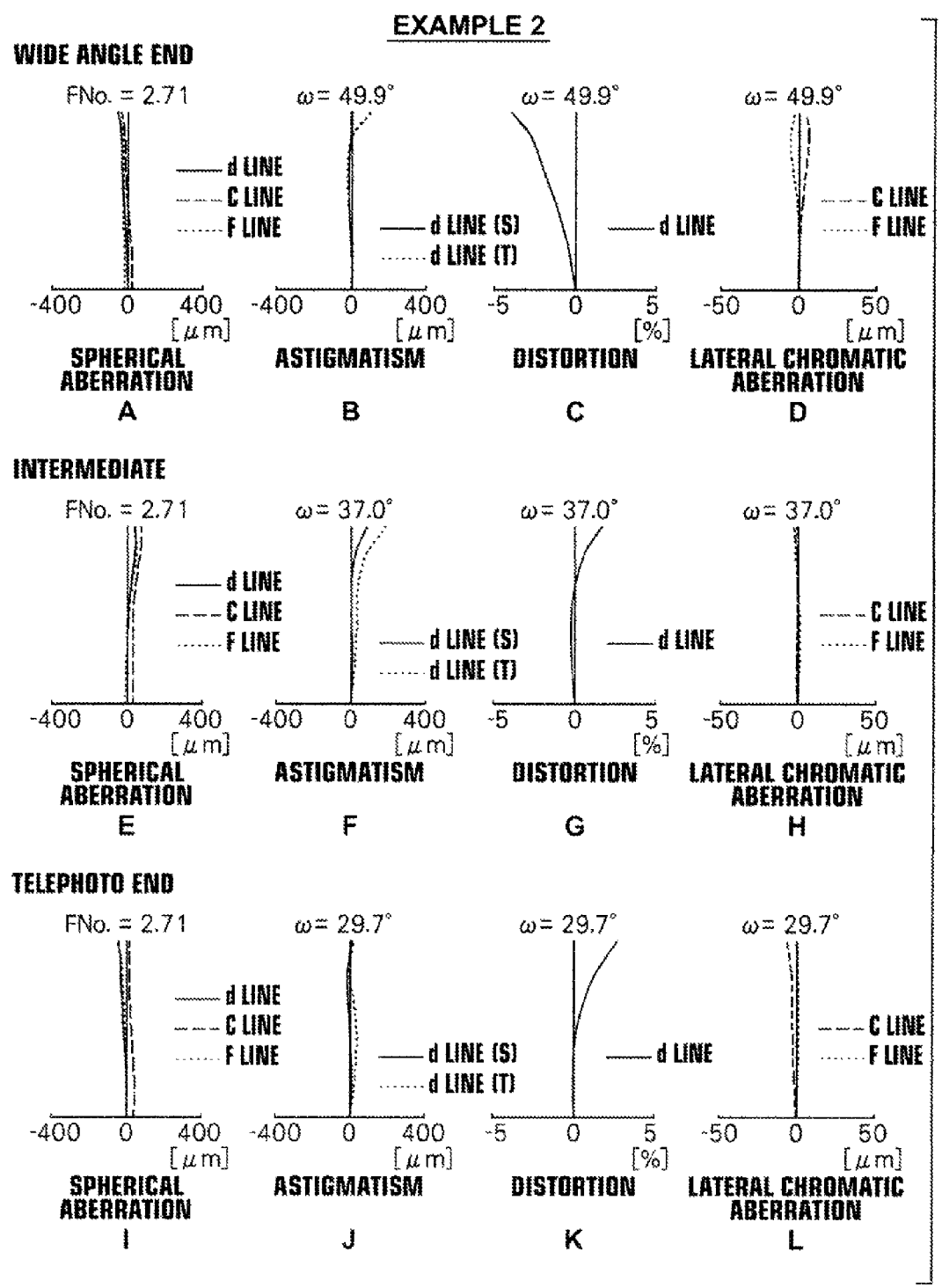
FIG. 10 is a collection of diagrams (A through L) that illustrate aberrations of the zoom lens of Example 2.

In addition, basic lens data of the zoom lens of Example 2 are shown in Table 5, data related to various items of the zoom lens of Example 2 are shown in Table 6, data related to the distances among movable surfaces of the zoom lens of Example 2 are shown in Table 7, data related to aspherical surface coefficients of the zoom lens of Example 2 are shown in Table 8, and various aberrations of the zoom lens of Example 2 are shown in A through L of FIG. 10.

TABLE 5

Example 2: Lens Data

| Si (Surface No.) | Ri (Radius of Curvature) | Di (Distance) | Ndi (Refractive Index) | vdj (Abbe's Number) | θg, Fj (Partial Dispersion Ratio) |
|---|---|---|---|---|---|
| *1 | 821.5018 | 4.5033 | 1.58313 | 59.38 | 0.5435 |
| 2 | 31.5717 | 17.1046 | | | |
| *3 | 112.8237 | 3.0008 | 1.74400 | 44.78 | 0.5656 |
| 4 | 29.3852 | 14.3024 | | | |
| 5 | −52.2372 | 2.3299 | 1.65160 | 58.55 | 0.5427 |
| 6 | 61.3517 | 6.2842 | 1.53172 | 48.84 | 0.5631 |
| 7 | 213.8560 | 5.1100 | | | |
| 8 | 136.3532 | 11.2833 | 1.80400 | 46.58 | 0.5573 |
| 9 | −94.7857 | DD [9] | | | |
| 10 | 328.4968 | 8.8107 | 1.51742 | 52.43 | 0.5565 |
| 11 | −66.0762 | 4.0007 | 1.84661 | 23.78 | 0.6207 |
| 12 | −106.9894 | 0.1495 | | | |
| 13 | 108.8604 | 2.4995 | 1.88100 | 40.14 | 0.5701 |
| 14 | 47.7436 | 11.0535 | 1.49700 | 81.54 | 0.5375 |
| 15 | −274.5647 | DD [15] | | | |
| 16 | −15632.8276 | 6.6588 | 1.49700 | 81.54 | 0.5375 |
| 17 | −66.4006 | 0.1491 | | | |
| 18 | 211.2845 | 2.4734 | 1.43875 | 94.93 | 0.5343 |
| 19 | 4209.3691 | DD [19] | | | |
| 20 | 61.1845 | 2.9992 | 1.58913 | 61.14 | 0.5407 |
| 21 | 43.1398 | 6.6406 | | | |
| 22 | −164.5955 | 1.1991 | 1.68893 | 31.07 | 0.6004 |
| 23 | 46.0859 | 3.3263 | | | |
| 24 | 54.8700 | 3.7000 | 1.78470 | 26.29 | 0.6136 |
| 25 | −534.4627 | DD [25] | | | |
| 26 | −77.3276 | 1.1991 | 1.60300 | 65.44 | 0.5402 |
| 27 | 46.9962 | 2.2700 | 1.80000 | 29.84 | 0.6018 |
| 28 | 106.8527 | DD [28] | | | |
| 29 (aperture stop) | ∞ | 1.2990 | | | |
| 30 | 63.5411 | 2.4660 | 1.80518 | 25.42 | 0.6162 |
| 31 | 443.3579 | 0.1491 | | | |
| 32 | 48.6249 | 8.0301 | 1.56384 | 60.83 | 0.5408 |
| 33 | −172.1528 | 0.4530 | | | |
| 34 | 718.9845 | 6.5372 | 1.55332 | 71.68 | 0.5403 |
| 35 | −30.8697 | 1.1991 | 1.90366 | 31.32 | 0.5948 |
| 36 | 97.5055 | 9.7747 | | | |
| 37 | 107.0521 | 4.1214 | 1.85002 | 32.40 | 0.5986 |
| 38 | −45.7197 | 3.0316 | | | |
| 39 | 35.1380 | 6.3252 | 1.49700 | 81.54 | 0.5375 |
| 40 | −30.5251 | 1.1991 | 1.88100 | 40.14 | 0.5701 |
| 41 | 26.0385 | 1.6118 | | | |
| 42 | 35.9154 | 7.8882 | 1.48749 | 70.23 | 0.5301 |
| 43 | −18.4695 | 1.1999 | 1.91082 | 35.25 | 0.5822 |
| 44 | 931.2713 | 1.2785 | | | |
| 45 | 112.2373 | 7.2528 | 1.48749 | 70.23 | 0.5301 |
| 46 | −23.2427 | 0.0000 | | | |
| 47 | ∞ | 2.3000 | 1.51633 | 64.14 | 0.5353 |
| 48 | ∞ | 30.8700 | | | |

TABLE 6

Example 2: Items (related to d line)

| | Wide Angle End | Intermediate | Telephoto End |
|---|---|---|---|
| Zoom Ratio | 1.00 | 1.49 | 1.95 |
| f | 13.801 | 20.563 | 26.911 |
| Bf | 32.386 | 32.386 | 32.386 |
| F No. | 2.71 | 2.71 | 2.71 |

TABLE 6-continued

Example 2: Items (related to d line)

| | Wide Angle End | Intermediate | Telephoto End |
|---|---|---|---|
| 2ω [°] | 99.8 | 74.0 | 59.4 |
| h | 38.550 | | |
| Yimg | 15.75 | | |

TABLE 7

Example 2: Zoom Distances

| | Wide Angle End | Intermediate | Telephoto End |
|---|---|---|---|
| DD [9] | 7.582 | 7.582 | 7.582 |
| DD [15] | 3.695 | 3.695 | 3.695 |
| DD [19] | 1.499 | 29.452 | 41.907 |
| DD [25] | 13.483 | 2.994 | 6.258 |
| DD [28] | 36.009 | 18.545 | 2.826 |

TABLE 8

Example 2: Aspherical Surface Coefficients

| Surface No. | 1 | Surface No. | 3 |
|---|---|---|---|
| KA | 1.00000000E+00 | KA | 1.00000000E+00 |
| A3 | −6.19960130E−06 | A4 | −5.32872676E−06 |
| A4 | 7.10169757E−06 | A6 | −4.14123998E−10 |
| A5 | −3.94902024E−08 | A8 | 1.36128219E−11 |
| A6 | −3.95088610E−09 | A10 | −4.94110009E−14 |
| A7 | 3.96583237E−11 | A12 | 1.14406960E−16 |
| A8 | 1.69064292E−12 | A14 | −1.61231505E−19 |
| A9 | 1.91914204E−15 | A16 | 1.23793133E−22 |
| A10 | −4.79410275E−16 | A18 | −3.98065907E−26 |
| A11 | −6.04038966E−18 | A20 | 6.85445131E−31 |
| A12 | −3.33911800E−20 | | |
| A13 | 6.15155323E−22 | | |
| A14 | 4.72501812E−23 | | |
| A15 | 1.23554996E−24 | | |
| A16 | 1.65224208E−26 | | |
| A17 | −1.51203736E−28 | | |
| A18 | −1.25849261E−29 | | |
| A19 | −1.85915802E−31 | | |
| A20 | 5.94365475E−33 | | |

Next, a zoom lens according to Example 3 will be described. FIG. 4 is a collection of sectional diagrams that illustrate the lens configuration of the zoom lens of Example 3.

The zoom lens of Example 3 is constituted by a first lens group G1 having a positive refractive power which is fixed while changing magnification, a second lens group G2 having a negative refractive power which moves while changing magnification, a third lens group G3 having a positive refractive power which moves while changing magnification, a fourth lens group G4 having a negative refractive power which moves while changing magnification, and a fifth lens group G5 (final lens group) having a positive refractive power which is fixed while changing magnification.

In addition, basic lens data of the zoom lens of Example 3 are shown in Table 9, data related to various items of the zoom lens of Example 3 are shown in Table 10, data related to the distances among movable surfaces of the zoom lens of Example 3 are shown in Table 11, data related to aspherical surface coefficients of the zoom lens of Example 3 are shown in Table 12, and various aberrations of the zoom lens of Example 3 are shown in A through L of FIG. 11.

TABLE 9

Example 3: Lens Data

| Si (Surface No.) | Ri (Radius of Curvature) | Di (Distance) | Ndi (Refractive Index) | vdj (Abbe's Number) | θg, Fj (Partial Dispersion Ratio) |
|---|---|---|---|---|---|
| *1 | 10000.0000 | 4.1998 | 1.58313 | 59.38 | 0.5435 |
| 2 | 32.2211 | 15.8119 | | | |
| *3 | 74.8507 | 2.9994 | 1.72916 | 54.68 | 0.5445 |
| 4 | 33.9087 | 15.9374 | | | |
| 5 | −60.8937 | 2.0004 | 1.62230 | 53.17 | 0.5542 |
| 6 | 52.2565 | 7.0614 | 1.64769 | 33.79 | 0.5939 |
| 7 | 268.1345 | 0.3004 | | | |
| 8 | 80.2515 | 13.1581 | 1.51742 | 52.43 | 0.5565 |
| 9 | −263.2128 | DD [9] | | | |
| 10 | 400.3201 | 12.7251 | 1.51742 | 52.43 | 0.5565 |
| 11 | −45.5823 | 3.0010 | 1.80518 | 25.42 | 0.6162 |
| 12 | −73.2623 | 0.1509 | | | |
| 13 | 92.2770 | 2.4002 | 1.88300 | 40.80 | 0.5656 |
| 14 | 47.3282 | 13.4005 | 1.49700 | 81.54 | 0.5375 |
| 15 | −131.3566 | DD [15] | | | |
| 16 | 440.5038 | 6.2316 | 1.49700 | 81.54 | 0.5375 |
| 17 | −84.6784 | 0.1490 | | | |
| 18 | 113.8967 | 1.8709 | 1.67790 | 55.34 | 0.5473 |
| 19 | 162.6816 | DD [19] | | | |
| 20 | 49.9400 | 1.9993 | 1.78472 | 25.68 | 0.6162 |
| 21 | 32.6069 | 5.5028 | | | |
| 22 | −172.4815 | 1.2010 | 1.60311 | 60.64 | 0.5415 |
| 23 | 37.4416 | DD [23] | | | |
| 24 | 46.7805 | 3.0176 | 1.78472 | 25.68 | 0.6162 |
| 25 | 148.9296 | DD [25] | | | |
| 26 | −38.6766 | 1.2008 | 1.60300 | 65.44 | 0.5402 |
| 27 | 53.0088 | 3.4169 | 1.80000 | 29.84 | 0.6018 |
| 28 | −227.4770 | DD [28] | | | |
| 29 (aperture stop) | ∞ | 1.7011 | | | |
| 30 | 128.5387 | 2.9391 | 1.80518 | 25.43 | 0.6103 |
| 31 | −102.8542 | 1.2149 | 1.80610 | 33.27 | 0.5885 |
| 32 | −123.8381 | 4.0718 | | | |
| 33 | 41.9640 | 6.9852 | 1.59282 | 68.63 | 0.5441 |
| 34 | −33.8072 | 1.2008 | 1.90366 | 31.32 | 0.5948 |
| 35 | 118.9395 | 10.4118 | | | |
| 36 | 230.1445 | 3.6022 | 1.84139 | 24.56 | 0.6127 |
| 37 | −48.2639 | 0.2996 | | | |
| 38 | 33.9414 | 4.9201 | 1.49700 | 81.54 | 0.5375 |
| 39 | −79.9336 | 1.2007 | 1.90366 | 31.32 | 0.5948 |
| 40 | 28.3339 | 1.9573 | | | |
| 41 | 47.1420 | 6.4878 | 1.56883 | 56.36 | 0.5489 |
| 42 | −25.7955 | 1.2008 | 1.91082 | 35.25 | 0.5822 |
| 43 | 133.4236 | 0.1509 | | | |
| 44 | 66.4493 | 4.8070 | 1.51633 | 64.14 | 0.5353 |
| 45 | −42.5558 | 42.1624 | | | |
| 46 | ∞ | 2.3000 | 1.51633 | 64.14 | 0.5353 |
| 47 | ∞ | 6.8700 | | | |

TABLE 10

Example 3: Items (related to d line)

| | Wide Angle End | Intermediate | Telephoto End |
|---|---|---|---|
| Zoom Ratio | 1.00 | 1.69 | 2.40 |
| f | 14.502 | 24.508 | 34.805 |
| Bf | 50.551 | 50.551 | 50.551 |
| F No. | 2.76 | 2.76 | 2.76 |
| 2ω [°] | 97.2 | 64.2 | 47.6 |
| h | 39.752 | | |
| Yimg | 15.75 | | |

TABLE 11

Example 3: Zoom Distances

| | Wide Angle End | Intermediate | Telephoto End |
|---|---|---|---|
| DD [9] | 1.999 | 1.999 | 1.999 |
| DD [15] | 3.194 | 3.194 | 3.194 |
| DD [19] | 1.500 | 30.612 | 46.067 |
| DD [23] | 2.918 | 3.870 | 2.748 |
| DD [25] | 32.001 | 9.398 | 4.944 |
| DD [28] | 18.948 | 11.487 | 1.607 |

TABLE 12

Example 3: Aspherical Surface Coefficients

| Surface No. | 1 | Surface No. | 3 |
|---|---|---|---|
| KA | 1.00000000E+00 | KA | 1.00000000E+00 |
| A3 | 0.00000000E+00 | A4 | −4.48998467E−06 |
| A4 | 6.99592748E−06 | A6 | −1.63755377E−09 |
| A5 | −9.31615918E−08 | A8 | 1.65105078E−11 |
| A6 | −1.82380523E−09 | A10 | −5.56597762E−14 |
| A7 | 2.16562421E−11 | A12 | 1.16193515E−16 |
| A8 | 1.18566591E−12 | A14 | −1.53007740E−19 |
| A9 | −9.20263760E−16 | A16 | 1.22395091E−22 |
| A10 | −3.67463235E−16 | A18 | −5.24386986E−26 |
| A11 | −2.61263836E−18 | A20 | 8.75856166E−30 |
| A12 | 8.84168154E−22 | | |
| A13 | 6.90400529E−23 | | |
| A14 | 1.72013889E−23 | | |
| A15 | 5.70263783E−25 | | |
| A16 | 8.00452042E−27 | | |
| A17 | 1.97107244E−29 | | |
| A18 | −1.77994399E−30 | | |
| A19 | −1.27198496E−31 | | |
| A20 | −6.59943874E−35 | | |

Figure 5:
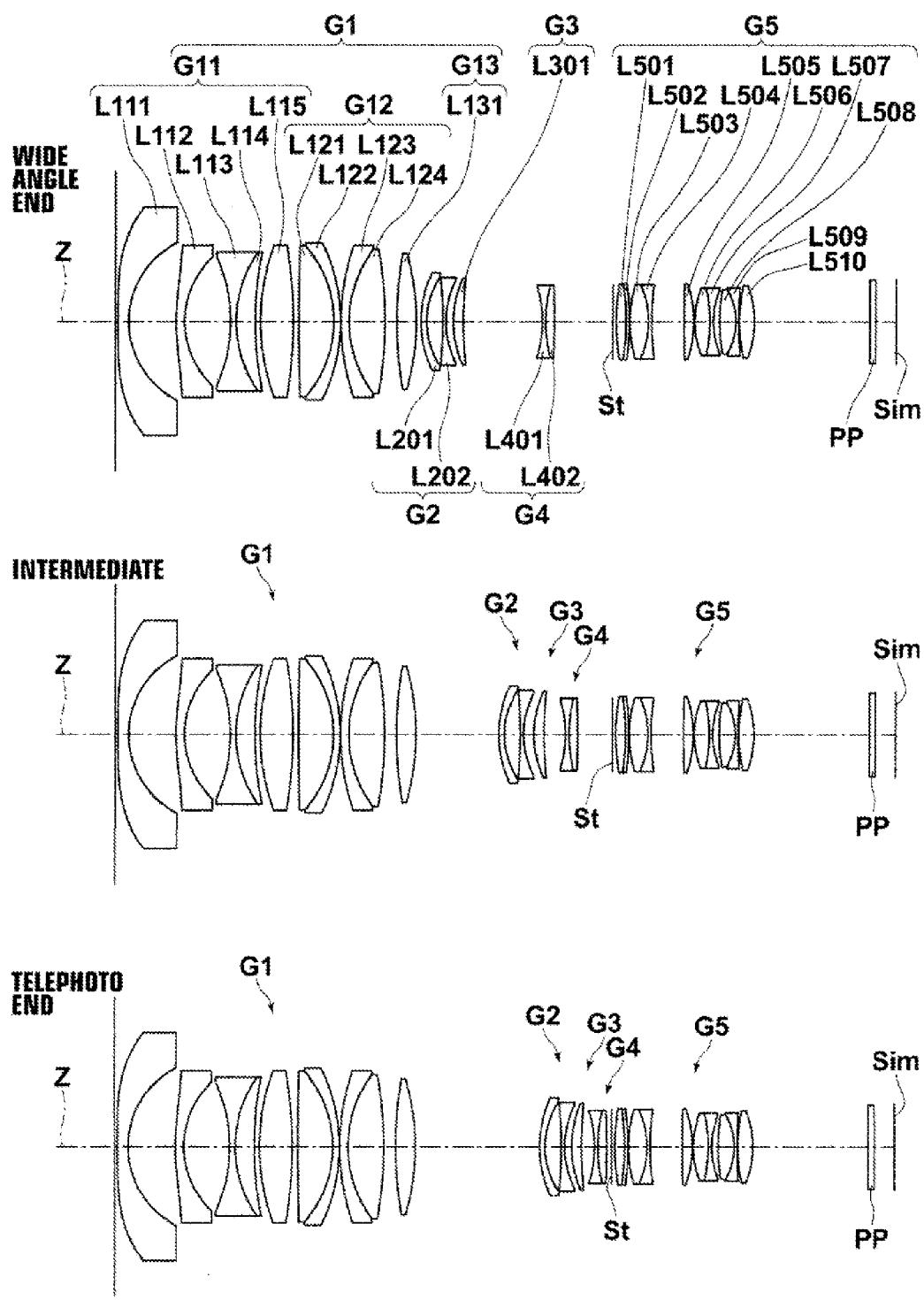
FIG. 5 is a collection of sectional diagrams that illustrate the configuration of a zoom lens according to Example 4.

Next, a zoom lens according to Example 4 will be described. FIG. 5 is a collection of sectional diagrams that illustrate the lens configuration of the zoom lens of Example 4.

The zoom lens of Example 4 is constituted by a first lens group G1 having a positive refractive power which is fixed while changing magnification, a second lens group G2 having a negative refractive power which moves while changing magnification, a third lens group G3 having a positive refractive power which moves while changing magnification, a fourth lens group G4 having a negative refractive power which moves while changing magnification, and a fifth lens group G5 (final lens group) having a positive refractive power which is fixed while changing magnification.

Figure 12:
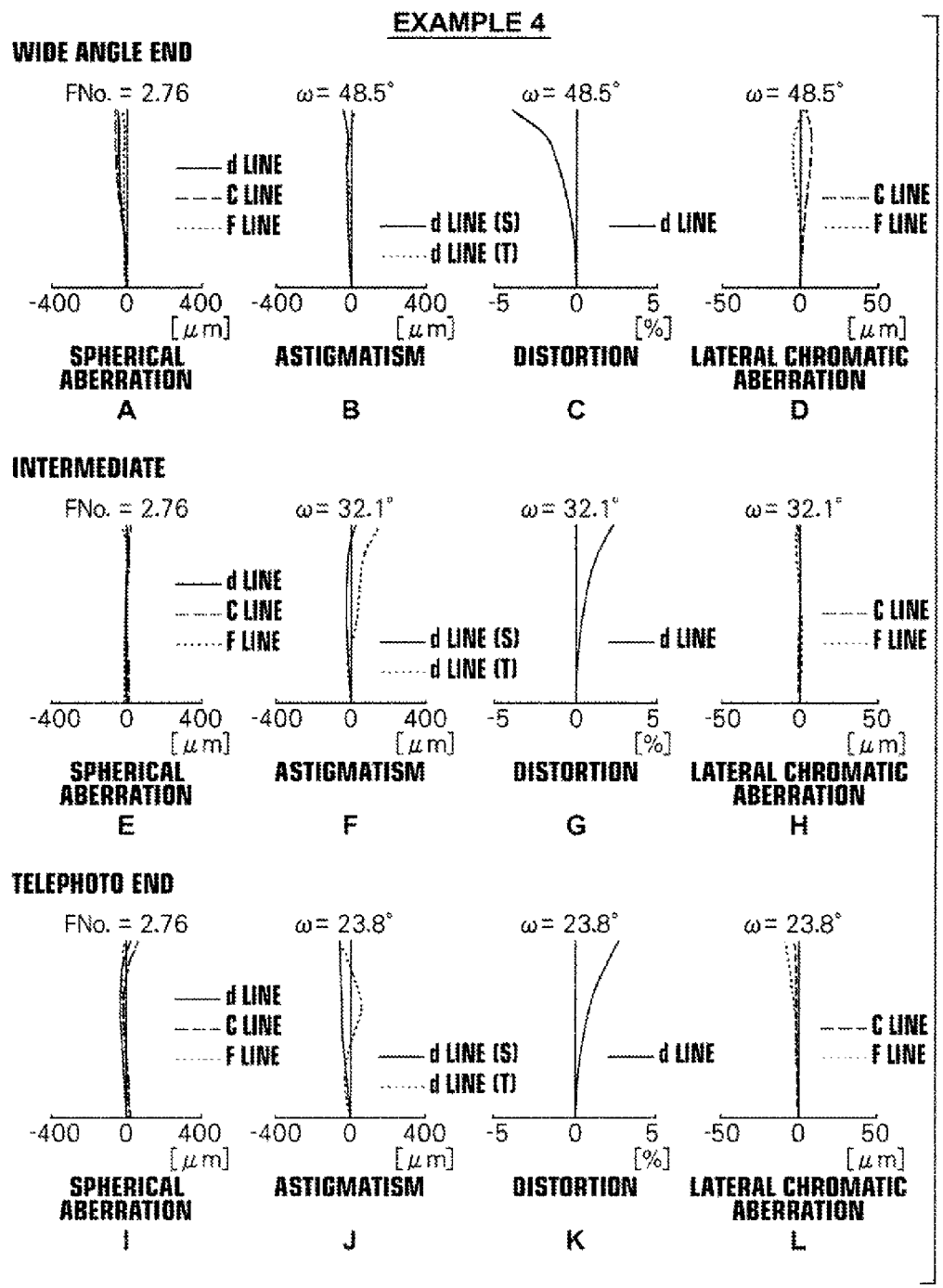
FIG. 12 is a collection of diagrams (A through L) that illustrate aberrations of the zoom lens of Example 4.

In addition, basic lens data of the zoom lens of Example 4 are shown in Table 13, data related to various items of the zoom lens of Example 4 are shown in Table 14, data related to the distances among movable surfaces of the zoom lens of Example 4 are shown in Table 15, data related to aspherical surface coefficients of the zoom lens of Example 4 are shown in Table 16, and various aberrations of the zoom lens of Example 4 are shown in A through L of FIG. 12.

TABLE 13

Example 4: Lens Data

| Si (Surface No.) | Ri (Radius of Curvature) | Di (Distance) | Ndi (Refractive Index) | vdj (Abbe's Number) | θg, Fj (Partial Dispersion Ratio) |
|---|---|---|---|---|---|
| *1 | 10000.0000 | 4.0006 | 1.58313 | 59.38 | 0.5435 |
| 2 | 32.9933 | 17.2882 | | | |

TABLE 13-continued

Example 4: Lens Data

| Si (Surface No.) | Ri (Radius of Curvature) | Di (Distance) | Ndi (Refractive Index) | vdj (Abbe's Number) | θg, Fj (Partial Dispersion Ratio) |
|---|---|---|---|---|---|
| *3 | 87.0979 | 3.0002 | 1.58913 | 61.14 | 0.5407 |
| 4 | 33.2350 | 16.5350 | | | |
| 5 | −58.3333 | 2.0003 | 1.58913 | 61.14 | 0.5407 |
| 6 | 45.1187 | 6.9705 | 1.59551 | 39.24 | 0.5804 |
| 7 | 131.6367 | 1.8871 | | | |
| 8 | 81.5665 | 11.9999 | 1.51742 | 52.43 | 0.5565 |
| 9 | −160.9692 | DD [9] | | | |
| 10 | 940.4868 | 12.8191 | 1.51742 | 52.43 | 0.5565 |
| 11 | −42.4380 | 2.4010 | 1.80518 | 25.42 | 0.6162 |
| 12 | −66.0091 | 0.1495 | | | |
| 13 | 86.9718 | 2.9994 | 1.88300 | 40.80 | 0.5656 |
| 14 | 45.5306 | 12.8459 | 1.49700 | 81.54 | 0.5375 |
| 15 | −157.5820 | DD [15] | | | |
| 16 | 153.1852 | 7.1314 | 1.49700 | 81.54 | 0.5375 |
| 17 | −88.9356 | DD [17] | | | |
| 18 | 43.2939 | 2.0008 | 1.62041 | 60.29 | 0.5427 |
| 19 | 29.9643 | 5.8258 | | | |
| 20 | −194.0683 | 1.1993 | 1.62041 | 60.29 | 0.5427 |
| 21 | 33.9926 | DD [21] | | | |
| 22 | 39.1631 | 3.6463 | 1.60342 | 38.03 | 0.5836 |
| 23 | 151.6252 | DD [23] | | | |
| 24 | −44.3515 | 1.2010 | 1.60300 | 65.44 | 0.5402 |
| 25 | 53.7225 | 3.1924 | 1.80000 | 29.84 | 0.6018 |
| 26 | −452.7386 | DD [26] | | | |
| 27 (aperture stop) | ∞ | 1.3177 | | | |
| 28 | 87.3983 | 3.4625 | 1.80518 | 25.43 | 0.6103 |
| 29 | −97.7067 | 1.2008 | 1.80610 | 33.27 | 0.5885 |
| 30 | −112.2153 | 0.1498 | | | |
| 31 | 47.7318 | 6.8015 | 1.59282 | 68.63 | 0.5441 |
| 32 | −33.0684 | 1.2010 | 1.90366 | 31.32 | 0.5948 |
| 33 | 100.3029 | 11.8604 | | | |
| 34 | 712.8535 | 3.5246 | 1.84139 | 24.56 | 0.6127 |
| 35 | −43.7794 | 0.2990 | | | |
| 36 | 33.0831 | 5.4367 | 1.49700 | 81.54 | 0.5375 |
| 37 | −58.3870 | 1.2003 | 1.90366 | 31.32 | 0.5948 |
| 38 | 29.1855 | 2.3905 | | | |
| 39 | 70.9544 | 5.7982 | 1.56883 | 56.36 | 0.5489 |
| 40 | −24.3753 | 1.2004 | 1.91082 | 35.25 | 0.5822 |
| 41 | 250.8216 | 0.1510 | | | |
| 42 | 63.3138 | 5.4349 | 1.51633 | 64.14 | 0.5353 |
| 43 | −37.5309 | 42.1624 | | | |
| 44 | ∞ | 2.3000 | 1.51633 | 64.14 | 0.5353 |
| 45 | ∞ | 7.2740 | | | |

TABLE 14

Example 4: Items (related to d line)

| | Wide Angle End | Intermediate | Telephoto End |
|---|---|---|---|
| Zoom Ratio | 1.00 | 1.69 | 2.40 |
| f | 14.502 | 24.509 | 34.805 |
| Bf | 50.954 | 50.954 | 50.954 |
| F No. | 2.76 | 2.76 | 2.76 |
| 2ω [°] | 97.0 | 64.2 | 47.6 |
| h | 40.475 | | |
| Yimg | 15.75 | | |

TABLE 15

Example 4: Zoom Distances

| | Wide Angle End | Intermediate | Telephoto End |
|---|---|---|---|
| DD [9] | 2.001 | 2.001 | 2.001 |
| DD [15] | 4.351 | 4.351 | 4.351 |
| DD [17] | 1.648 | 30.144 | 45.142 |

TABLE 15-continued

Example 4: Zoom Distances

| | Wide Angle End | Intermediate | Telephoto End |
|---|---|---|---|
| DD [21] | 2.708 | 3.660 | 2.538 |
| DD [23] | 28.703 | 7.715 | 4.698 |
| DD [26] | 21.115 | 12.655 | 1.796 |

TABLE 16

Example 4: Aspherical Surface Coefficients

| Surface No. | 1 | Surface No. | 3 |
|---|---|---|---|
| KA | 1.00000000E+00 | KA | 1.00000000E+00 |
| A3 | 0.00000000E+00 | A4 | −5.29504060E−06 |
| A4 | 6.75059893E−06 | A6 | −5.71449059E−10 |
| A5 | −8.28752745E−08 | A8 | 1.57517676E−11 |
| A6 | −1.96498556E−09 | A10 | −5.54412820E−14 |
| A7 | 2.02284701E−11 | A12 | 1.16432393E−16 |
| A8 | 1.18830034E−12 | A14 | −1.53241444E−19 |
| A9 | −5.05719925E−16 | A16 | 1.22413439E−22 |
| A10 | −3.57264124E−16 | A18 | −5.26028411E−26 |
| A11 | −2.39742061E−18 | A20 | 8.89038276E−30 |
| A12 | 4.34277976E−21 | | |
| A13 | 1.09559279E−22 | | |
| A14 | 1.67422397E−23 | | |
| A15 | 5.24037655E−25 | | |
| A16 | 6.31296722E−27 | | |
| A17 | −2.61711042E−29 | | |
| A18 | −2.31751638E−30 | | |
| A19 | −1.27029101E−31 | | |
| A20 | 1.16955006E−33 | | |

Figure 6:
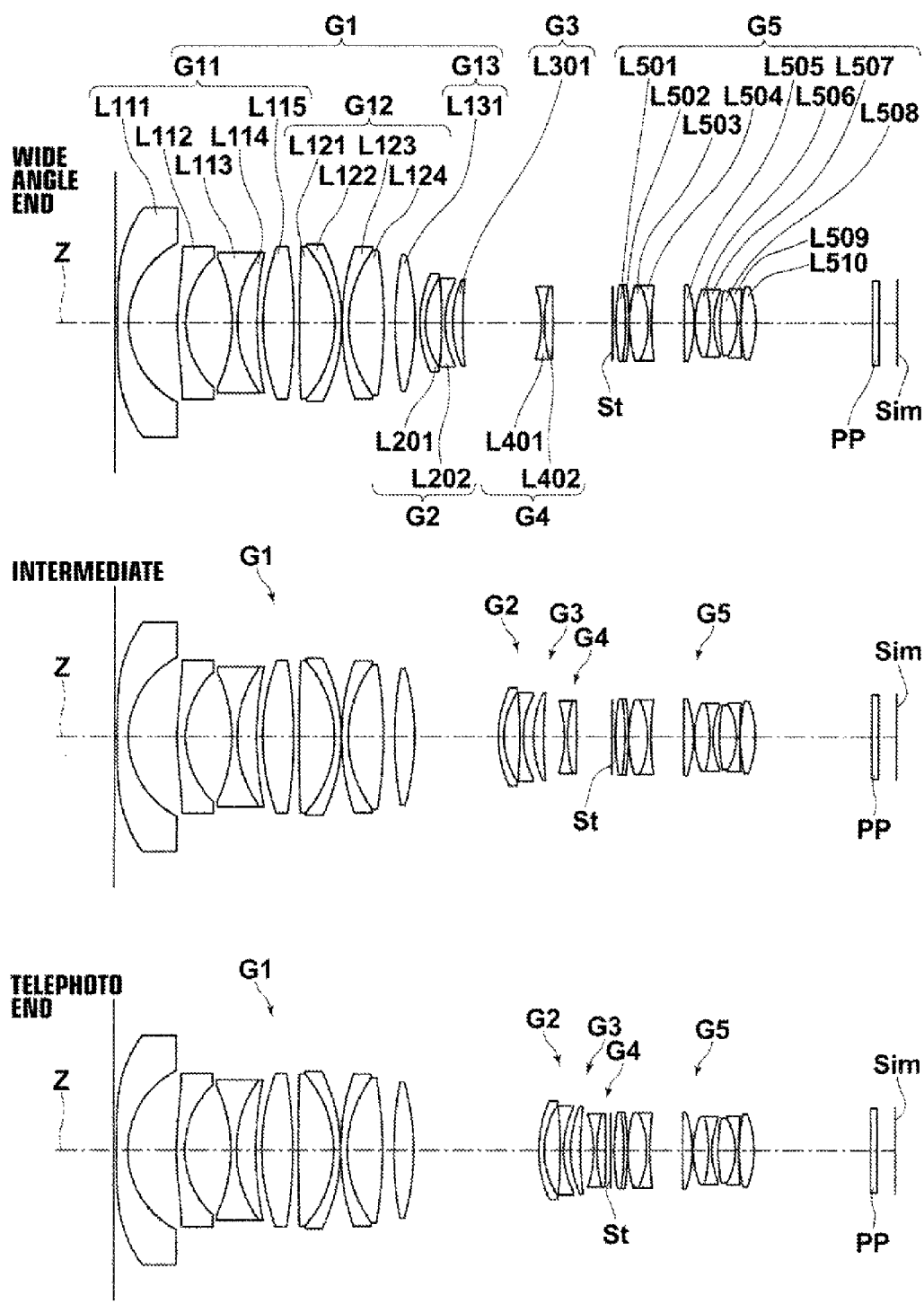
FIG. 6 is a collection of sectional diagrams that illustrate the configuration of a zoom lens according to Example 5.

Next, a zoom lens according to Example 5 will be described. FIG. 6 is a collection of sectional diagrams that illustrate the lens configuration of the zoom lens of Example 5.

The zoom lens of Example 5 is constituted by a first lens group G1 having a positive refractive power which is fixed while changing magnification, a second lens group G2 having a negative refractive power which moves while changing magnification, a third lens group G3 having a positive refractive power which moves while changing magnification, a fourth lens group G4 having a negative refractive power which moves while changing magnification, and a fifth lens group G5 (final lens group) having a positive refractive power which is fixed while changing magnification.

In addition, basic lens data of the zoom lens of Example 5 are shown in Table 17, data related to various items of the zoom lens of Example 5 are shown in Table 18, data related to the distances among movable surfaces of the zoom lens of Example 5 are shown in Table 19, data related to aspherical surface coefficients of the zoom lens of Example 5 are shown in Table 20, and various aberrations of the zoom lens of Example 5 are shown in A through L of FIG. 13.

TABLE 17

Example 5: Lens Data

| Si (Surface No.) | Ri (Radius of Curvature) | Di (Distance) | Ndi (Refractive Index) | vdj (Abbe's Number) | θg, Fj (Partial Dispersion Ratio) |
|---|---|---|---|---|---|
| *1 | 9996.1662 | 3.9990 | 1.58313 | 59.38 | 0.5435 |
| 2 | 33.0268 | 17.6736 | | | |
| *3 | 92.7441 | 3.0004 | 1.56384 | 60.67 | 0.5403 |

TABLE 17-continued

Example 5: Lens Data

| Si (Surface No.) | Ri (Radius of Curvature) | Di (Distance) | Ndi (Refractive Index) | vdj (Abbe's Number) | θg, Fj (Partial Dispersion Ratio) |
|---|---|---|---|---|---|
| 4 | 32.9830 | 16.7002 | | | |
| 5 | −57.7257 | 2.0009 | 1.56384 | 60.67 | 0.5403 |
| 6 | 44.4273 | 6.9894 | 1.59551 | 39.24 | 0.5804 |
| 7 | 123.4868 | 2.2107 | | | |
| 8 | 81.8371 | 11.0878 | 1.51742 | 52.43 | 0.5565 |
| 9 | −175.4565 | DD [9] | | | |
| 10 | 908.4134 | 12.8193 | 1.51742 | 52.43 | 0.5565 |
| 11 | −42.4326 | 2.4005 | 1.80518 | 25.42 | 0.6162 |
| 12 | −65.6231 | 0.1510 | | | |
| 13 | 86.6019 | 2.4000 | 1.88300 | 40.80 | 0.5656 |
| 14 | 45.0903 | 12.7416 | 1.49700 | 81.54 | 0.5375 |
| 15 | −168.5297 | DD [15] | | | |
| 16 | 144.0425 | 7.2491 | 1.49700 | 81.54 | 0.5375 |
| 17 | −89.5821 | DD [17] | | | |
| 18 | 43.5673 | 2.0001 | 1.62041 | 60.29 | 0.5427 |
| 19 | 29.8335 | 5.8291 | | | |
| 20 | −200.5387 | 1.2005 | 1.62041 | 60.29 | 0.5427 |
| 21 | 34.0496 | DD [21] | | | |
| 22 | 39.1990 | 3.6683 | 1.60342 | 38.03 | 0.5836 |
| 23 | 156.1540 | DD [23] | | | |
| 24 | −43.9071 | 1.2006 | 1.60300 | 65.44 | 0.5402 |
| 25 | 54.0052 | 3.1865 | 1.80000 | 23.84 | 0.6018 |
| 26 | −430.7076 | DD [26] | | | |
| 27 (aperture stop) | ∞ | 1.3026 | | | |
| 28 | 85.9546 | 3.4471 | 1.80518 | 25.43 | 0.6103 |
| 29 | −100.1930 | 1.1997 | 1.80610 | 33.27 | 0.5885 |
| 30 | −110.4660 | 0.1505 | | | |
| 31 | 48.3759 | 6.7674 | 1.53282 | 68.63 | 0.5441 |
| 32 | −32.8141 | 1.1999 | 1.90366 | 31.32 | 0.5948 |
| 33 | 100.3206 | 11.8554 | | | |
| 34 | 718.3071 | 3.5385 | 1.84139 | 24.56 | 0.6127 |
| 35 | −43.5209 | 0.2992 | | | |
| 36 | 33.2408 | 5.4687 | 1.49700 | 81.54 | 0.5375 |
| 37 | −56.8048 | 1.2002 | 1.90366 | 31.32 | 0.5948 |
| 38 | 29.1867 | 2.3596 | | | |
| 39 | 68.8322 | 6.2059 | 1.56883 | 56.36 | 0.5489 |
| 40 | −24.2121 | 1.2004 | 1.91082 | 35.25 | 0.5822 |
| 41 | 224.8661 | 0.1499 | | | |
| 42 | 62.5064 | 5.5209 | 1.51633 | 64.14 | 0.5353 |
| 43 | −36.7534 | 42.1624 | | | |
| 44 | ∞ | 2.3000 | 1.51633 | 64.14 | 0.5353 |
| 45 | ∞ | 6.7840 | | | |

TABLE 18

Example 5: Items (related to d line)

| | Wide Angle End | Intermediate | Telephoto End |
|---|---|---|---|
| Zoom Ratio | 1.00 | 1.69 | 2.40 |
| f | 14.502 | 24.508 | 34.805 |
| Bf | 50.465 | 50.465 | 50.465 |
| F No. | 2.76 | 2.76 | 2.76 |
| 2ω [°] | 97.0 | 64.2 | 47.6 |
| h | 40.585 | | |
| Yimg | 15.75 | | |

TABLE 19

Example 5: Zoom Distances

| | Wide Angle End | Intermediate | Telephoto End |
|---|---|---|---|
| DD [9] | 2.001 | 2.001 | 2.001 |
| DD [15] | 4.134 | 4.134 | 4.134 |
| DD [17] | 1.650 | 30.084 | 45.030 |

TABLE 19-continued

Example 5: Zoom Distances

| | Wide Angle End | Intermediate | Telephoto End |
|---|---|---|---|
| DD [21] | 2.704 | 3.656 | 2.535 |
| DD [23] | 28.332 | 7.585 | 4.692 |
| DD [26] | 21.359 | 12.719 | 1.787 |

TABLE 20

Example 5: Aspherical Surface Coefficients

| Surface No. | 1 | Surface No. | 3 |
|---|---|---|---|
| KA | 1.00000000E+00 | KA | 1.00000000E+00 |
| A3 | 0.00000000E+00 | A4 | −5.34557685E−06 |
| A4 | 6.62012404E−06 | A6 | −4.77918366E−10 |
| A5 | −8.00989016E−08 | A8 | 1.56978908E−11 |
| A6 | −1.97332847E−09 | A10 | −5.54192293E−14 |
| A7 | 2.00322887E−11 | A12 | 1.16440250E−16 |
| A8 | 1.18543694E−12 | A14 | −1.53260905E−19 |
| A9 | −5.62931037E−16 | A16 | 1.22421216E−22 |
| A10 | −3.58303992E−16 | A18 | −5.25557609E−26 |
| A11 | −2.40915082E−18 | A20 | 8.84678479E−30 |
| A12 | 4.42425152E−21 | | |
| A13 | 1.18549232E−22 | | |
| A14 | 1.69519099E−23 | | |
| A15 | 5.26851207E−25 | | |
| A16 | 6.24066577E−27 | | |
| A17 | −2.83311374E−29 | | |
| A18 | −2.36817680E−30 | | |
| A19 | −1.28243816E−31 | | |
| A20 | 1.23191223E−33 | | |

Figure 7:
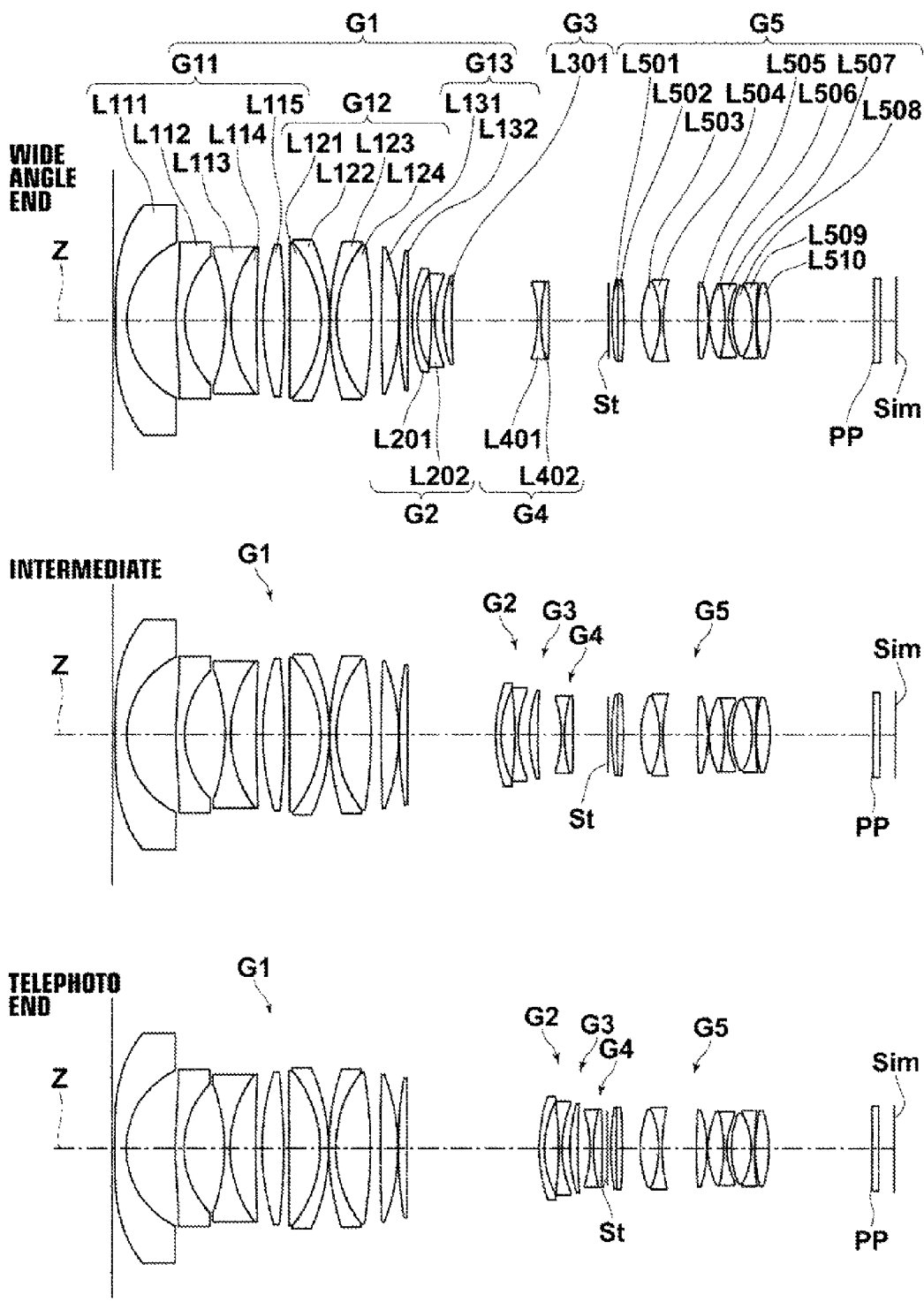
FIG. 7 is a collection of sectional diagrams that illustrate the configuration of a zoom lens according to Example 6.

Next, a zoom lens according to Example 6 will be described. FIG. 7 is a collection of sectional diagrams that illustrate the lens configuration of the zoom lens of Example 6.

The zoom lens of Example 6 is constituted by a first lens group G1 having a positive refractive power which is fixed while changing magnification, a second lens group G2 having a negative refractive power which moves while changing magnification, a third lens group G3 having a positive refractive power which moves while changing magnification, a fourth lens group G4 having a negative refractive power which moves while changing magnification, and a fifth lens group G5 (final lens group) having a positive refractive power which is fixed while changing magnification.

Figure 14:
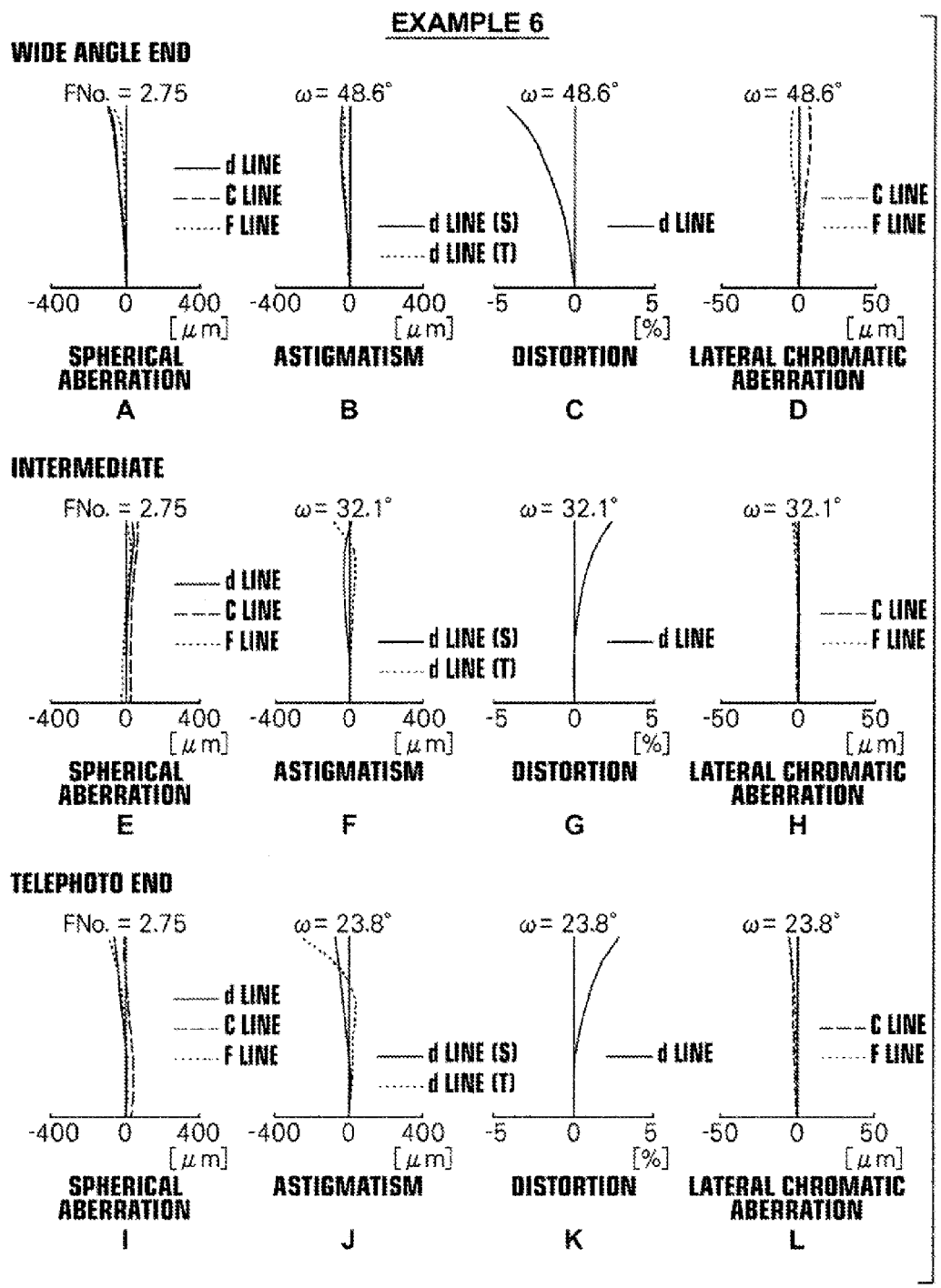
FIG. 14 is a collection of diagrams (A through L) that illustrate aberrations of the zoom lens of Example 6.

In addition, basic lens data of the zoom lens of Example 6 are shown in Table 21, data related to various items of the zoom lens of Example 6 are shown in Table 22, data related to the distances among movable surfaces of the zoom lens of Example 6 are shown in Table 23, data related to aspherical surface coefficients of the zoom lens of Example 6 are shown in Table 24, and various aberrations of the zoom lens of Example 6 are shown in A through L of FIG. 14.

TABLE 21

Example 6: Lens Data

| Si (Surface No.) | Ri (Radius of Curvature) | Di (Distance) | Ndi (Refractive Index) | vdj (Abbe's Number) | θg, Fj (Partial Dispersion Ratio) |
|---|---|---|---|---|---|
| *1 | 833.2049 | 4.2000 | 1.58313 | 59.38 | 0.5435 |
| 2 | 31.7636 | 17.9002 | | | |
| *3 | 127.6910 | 3.0000 | 1.72916 | 54.68 | 0.5445 |

TABLE 21-continued

Example 6: Lens Data

| Si (Surface No.) | Ri (Radius of Curvature) | Di (Distance) | Ndi (Refractive Index) | vdj (Abbe's Number) | θg, Fj (Partial Dispersion Ratio) |
|---|---|---|---|---|---|
| 4 | 34.3126 | 14.6813 | | | |
| 5 | −69.9234 | 2.0609 | 1.65100 | 56.16 | 0.5482 |
| 6 | 45.5660 | 9.2669 | 1.80610 | 40.92 | 0.5702 |
| 7 | 578.7597 | 2.3162 | | | |
| 8 | 93.6917 | 7.8281 | 1.51742 | 52.43 | 0.5565 |
| 9 | −256.4813 | DD [9] | | | |
| 10 | ∞ | 11.3461 | 1.51742 | 52.43 | 0.5565 |
| 11 | −44.7600 | 3.0000 | 1.80518 | 25.42 | 0.6162 |
| 12 | −73.1209 | 0.1503 | | | |
| 13 | 96.2962 | 2.4200 | 1.88300 | 40.80 | 0.5656 |
| 14 | 46.8100 | 12.4094 | 1.49700 | 81.54 | 0.5375 |
| 15 | −180.2152 | DD [15] | | | |
| 16 | 951.6580 | 6.3106 | 1.49700 | 81.54 | 0.5375 |
| 17 | −77.2853 | 0.1509 | | | |
| 18 | 163.9945 | 3.0654 | 1.51633 | 64.14 | 0.5353 |
| 19 | ∞ | DD [19] | | | |
| 20 | 57.6292 | 2.0006 | 1.80519 | 25.40 | 0.6157 |
| 21 | 37.7564 | 5.0473 | | | |
| 22 | −146.0915 | 1.2000 | 1.62041 | 60.29 | 0.5427 |
| 23 | 41.6554 | DD [23] | | | |
| 24 | 54.8186 | 3.0165 | 1.78472 | 25.68 | 0.6162 |
| 25 | 265.6294 | DD [25] | | | |
| 26 | −43.8649 | 1.2000 | 1.60300 | 65.44 | 0.5402 |
| 27 | 56.3300 | 3.0813 | 1.80000 | 29.84 | 0.6018 |
| 28 | −477.8065 | DD [28] | | | |
| 29 (aperture stop) | ∞ | 1.3000 | | | |
| 30 | 83.3692 | 2.1698 | 1.80518 | 25.42 | 0.6162 |
| 31 | 633.2100 | 2.1715 | 1.80400 | 46.58 | 0.5573 |
| 32 | −187.0891 | 6.3158 | | | |
| 33 | 36.6370 | 6.9118 | 1.61800 | 63.33 | 0.5441 |
| 34 | −36.6370 | 1.2000 | 1.90366 | 31.32 | 0.5948 |
| 35 | 63.4913 | 12.4536 | | | |
| 36 | 218.6049 | 3.7518 | 1.84139 | 24.56 | 0.6127 |
| 37 | −45.5768 | 0.3017 | | | |
| 38 | 31.9703 | 5.6143 | 1.49700 | 81.54 | 0.5375 |
| 39 | −61.6770 | 1.2000 | 1.91082 | 35.25 | 0.5822 |
| 40 | 26.9714 | 1.6352 | | | |
| 41 | 33.2963 | 7.2686 | 1.51633 | 64.14 | 0.5353 |
| 42 | −26.3200 | 1.2000 | 1.91082 | 35.25 | 0.5822 |
| 43 | 122.8536 | 0.2203 | | | |
| 44 | 59.1966 | 4.9714 | 1.51633 | 64.14 | 0.5353 |
| 45 | −46.6277 | 37.6430 | | | |
| 46 | ∞ | 2.3000 | 1.51633 | 64.14 | 0.5353 |
| 47 | ∞ | 5.7960 | | | |

TABLE 22

Example 6: Items (related to d line)

| | Wide Angle End | Intermediate | Telephoto End |
|---|---|---|---|
| Zoom Ratio | 1.00 | 1.69 | 2.40 |
| f | 14.503 | 24.510 | 34.808 |
| Bf | 44.956 | 44.956 | 44.956 |
| F No. | 2.75 | 2.75 | 2.75 |
| 2ω [°] | 97.2 | 64.2 | 47.6 |
| h | 39.391 | | |
| Yimg | 15.75 | | |

TABLE 23

Example 6: Zoom Distances

| | Wide Angle End | Intermediate | Telephoto End |
|---|---|---|---|
| DD [9] | 1.999 | 1.999 | 1.999 |
| DD [15] | 3.720 | 3.720 | 3.720 |
| DD [19] | 1.500 | 31.951 | 47.943 |
| DD [23] | 3.097 | 3.968 | 2.812 |
| DD [25] | 31.053 | 8.441 | 4.417 |
| DD [28] | 21.337 | 12.628 | 1.816 |

TABLE 24

Example 6: Aspherical Surface Coefficients

| Surface No. | 1 | Surface No. | 3 |
|---|---|---|---|
| KA | 1.00000000E+00 | KA | 1.00000000E+00 |
| A3 | −7.36624463E−06 | A4 | −4.10988571E−06 |
| A4 | 6.48233272E−06 | A6 | −1.21995779E−09 |
| A5 | −7.39213084E−08 | A8 | 1.59589857E−11 |
| A6 | −1.96775959E−09 | A10 | −5.49266080E−14 |
| A7 | 1.87763145E−11 | A12 | 1.16559890E−16 |
| A8 | 1.19443930E−12 | A14 | −1.54783593E−19 |
| A9 | 1.64603963E−16 | A16 | 1.23414774E−22 |
| A10 | −3.50236069E−16 | A18 | −5.23355121E−26 |
| A11 | −2.53695199E−18 | A20 | 8.61685265E−30 |
| A12 | −4.38860761E−21 | | |
| A13 | −1.40947481E−22 | | |
| A14 | 1.29050477E−23 | | |
| A15 | 5.05727148E−25 | | |
| A16 | 8.41600054E−27 | | |
| A17 | 1.65092551E−28 | | |
| A18 | −8.29887329E−31 | | |
| A19 | −8.12713794E−32 | | |
| A20 | −1.81223806E−33 | | |

Figure 8:
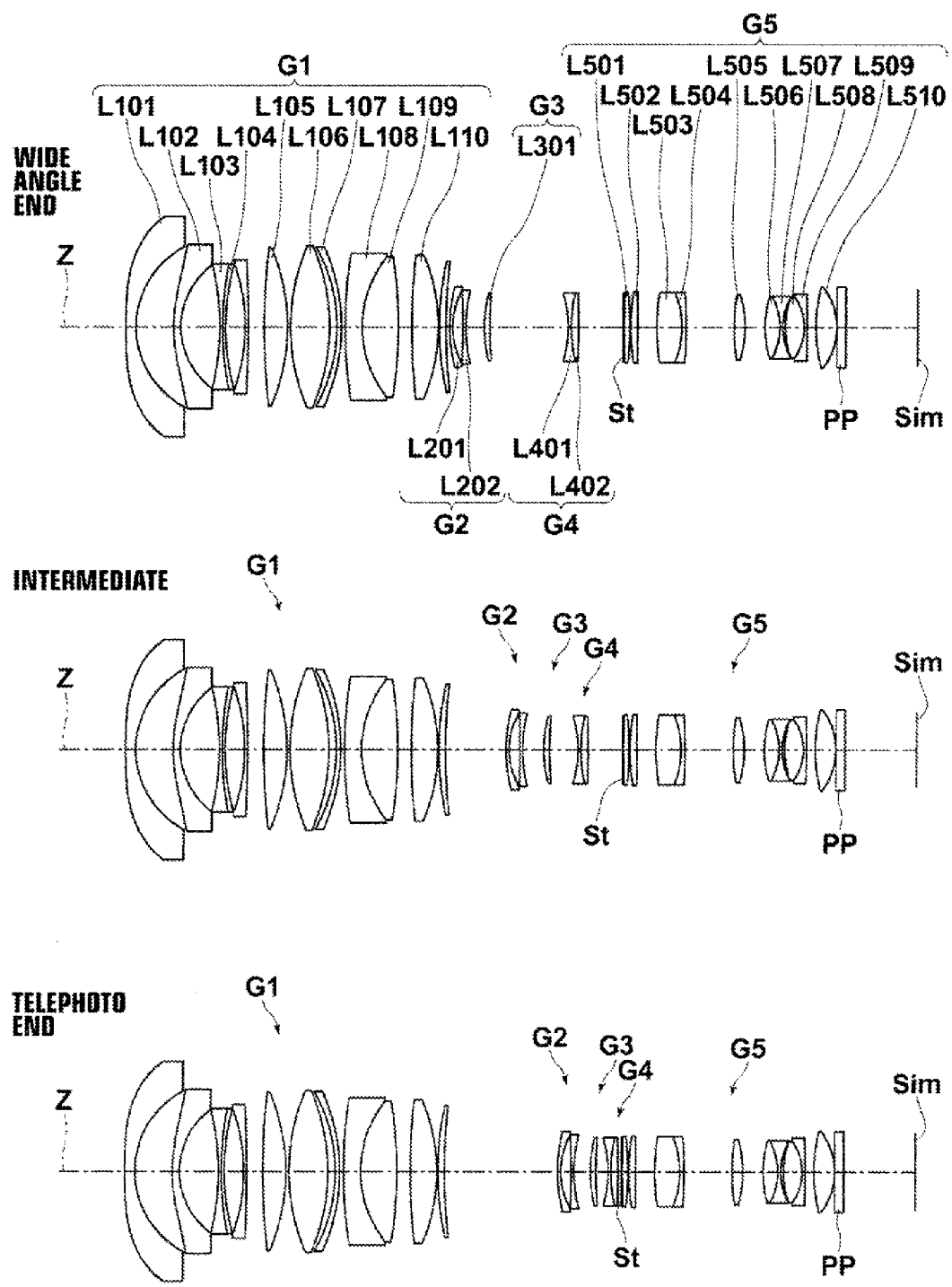
FIG. 8 is a collection of sectional diagrams that illustrate the configuration of a zoom lens according to Example 7.

Next, a zoom lens according to Example 7 will be described. FIG. 8 is a collection of sectional diagrams that illustrate the lens configuration of the zoom lens of Example 7.

The zoom lens of Example 7 is constituted by a first lens group G1 having a positive refractive power which is fixed while changing magnification, a second lens group G2 having a negative refractive power which moves while changing magnification, a third lens group G3 having a positive refractive power which moves while changing magnification, a fourth lens group G4 having a negative refractive power which moves while changing magnification, and a fifth lens group G5 (final lens group) having a positive refractive power which is fixed while changing magnification.

Figure 15:
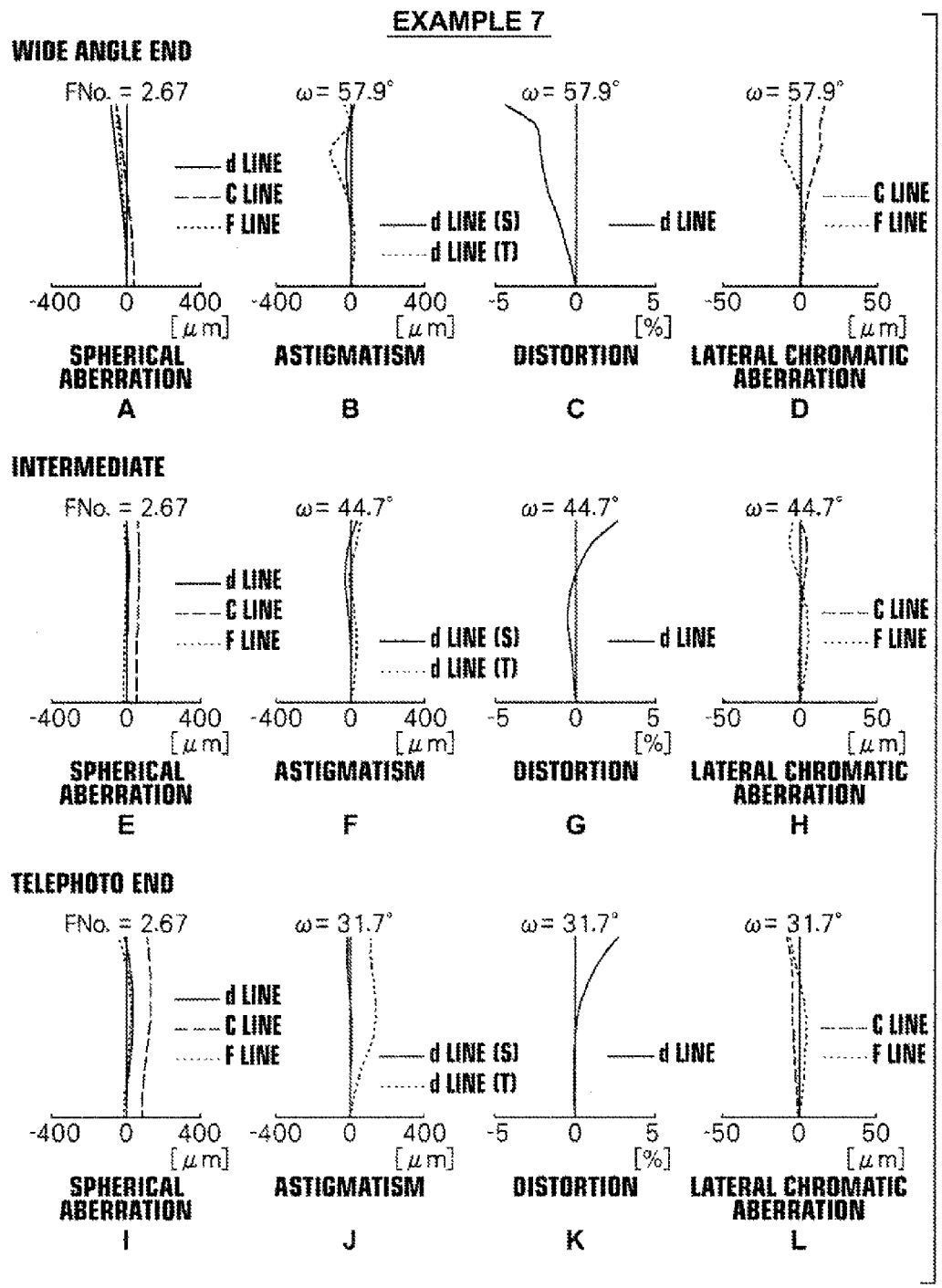
FIG. 15 is a collection of diagrams (A through L) that illustrate aberrations of the zoom lens of Example 7.

In addition, basic lens data of the zoom lens of Example 7 are shown in Table 25, data related to various items of the zoom lens of Example 7 are shown in Table 26, data related to the distances among movable surfaces of the zoom lens of Example 7 are shown in Table 27, data related to aspherical surface coefficients of the zoom lens of Example 7 are shown in Table 28, and various aberrations of the zoom lens of Example 7 are shown in A through L of FIG. 15.

TABLE 25

Example 7: Lens Data

| Si (Surface No.) | Ri (Radius of Curvature) | Di (Distance) | Ndi (Refractive Index) | θg, Fj (Abbe's Number) |
|---|---|---|---|---|
| *1 | 474.1079 | 4.0745 | 1.88000 | 36.02 |
| 2 | 38.1537 | 15.3232 | | |

TABLE 25-continued

Example 7: Lens Data

| Si (Surface No.) | Ri (Radius of Curvature) | Di (Distance) | Ndi (Refractive Index) | θg, Fj (Abbe's Number) |
|---|---|---|---|---|
| *3 | 57.6675 | 3.0000 | 1.88000 | 40.00 |
| 4 | 32.3563 | 15.9448 | | |
| 5 | −111.1467 | 1.2000 | 1.88300 | 40.76 |
| 6 | 140.5909 | 1.2000 | 1.88300 | 40.76 |
| 7 | 101.7368 | 8.0019 | | |
| 8 | −77.3379 | 1.2000 | 1.43500 | 82.06 |
| 9 | −615.4996 | 6.6907 | | |
| 10 | 301.7285 | 9.6136 | 1.87999 | 34.48 |
| 11 | −83.3740 | 1.1964 | | |
| 12 | 87.3406 | 15.9509 | 1.43956 | 87.94 |
| 13 | −86.3341 | 2.9828 | | |
| 14 | −69.4525 | 1.7988 | 1.88000 | 24.68 |
| 15 | −82.1391 | 1.5524 | | |
| 16 | 205.8050 | 6.9859 | 1.88001 | 33.30 |
| 17 | 47.9172 | 14.8863 | 1.43501 | 86.05 |
| 18 | −188.9332 | 5.4496 | | |
| 19 | 275.6761 | 11.0517 | 1.56570 | 69.89 |
| 20 | −76.4781 | 0.3443 | | |
| 21 | 123.8611 | 2.7878 | 1.44152 | 89.00 |
| 22 | 240.6510 | DD [22] | | |
| *23 | 67.8102 | 1.2534 | 1.88000 | 40.00 |
| 24 | 31.7225 | 4.2411 | | |
| 25 | −484.3459 | 1.2000 | 1.68126 | 57.44 |
| 26 | 63.9111 | DD [26] | | |
| 27 | 56.2453 | 2.3229 | 1.79506 | 25.25 |
| 28 | 158.3898 | DD [28] | | |
| 29 | −47.7543 | 1.2000 | 1.56867 | 65.78 |
| 30 | 64.6989 | 2.9294 | 1.88000 | 28.37 |
| 31 | −552.2441 | DD [31] | | |
| 32 (aperture stop) | ∞ | 0.2993 | | |
| 33 | 459.5820 | 2.4215 | 1.43501 | 89.63 |
| 34 | −127.7905 | 0.2970 | | |
| 35 | 90.0800 | 2.8112 | 1.74142 | 27.93 |
| 36 | −14886.6570 | 7.8174 | | |
| 37 | 95.5653 | 10.1929 | 1.55514 | 71.35 |
| 38 | −39.6539 | 1.6944 | 1.85632 | 34.30 |
| 39 | −251.4526 | 19.7231 | | |
| 40 | 90.7134 | 4.4685 | 1.46016 | 62.61 |
| 41 | −50.6603 | 8.2083 | | |
| 42 | 44.6260 | 6.1506 | 1.63441 | 34.69 |
| 43 | −26.8777 | 1.1999 | 1.87980 | 25.58 |
| 44 | 26.3581 | 1.0758 | | |
| 45 | 39.0893 | 7.7742 | 1.52585 | 50.15 |
| 46 | −21.5664 | 1.2000 | 1.87768 | 40.23 |
| 47 | −470.8190 | 3.6661 | | |
| 48 | 70.5057 | 8.5184 | 1.46393 | 85.55 |
| 49 | −28.0438 | 0.0000 | | |
| 50 | ∞ | 3.7000 | 1.51633 | 64.14 |
| 51 | ∞ | 29.5110 | | |

TABLE 26

Example 7: Items (related to d line)

| | Wide Angle End | Intermediate | Telephoto End |
|---|---|---|---|
| Zoom Ratio | 1.00 | 1.50 | 2.40 |
| f' | 10.348 | 15.522 | 24.834 |
| Bf' | 31.950 | 31.950 | 31.950 |
| F No. | 2.67 | 2.67 | 2.67 |
| 2ω [°] | 115.8 | 89.4 | 63.4 |
| h | 45.011 | | |
| Yimg | 15.75 | | |

TABLE 27

Example 7: Zoom Distances

| | Wide Angle End | Intermediate | Telephoto End |
|---|---|---|---|
| DD [22] | 1.500 | 24.832 | 46.278 |
| DD [26] | 7.494 | 8.700 | 6.716 |
| DD [28] | 31.917 | 11.571 | 4.959 |
| DD [31] | 18.568 | 14.375 | 1.526 |

TABLE 28

Example 7: Aspherical Surface Coefficients

| | Surface No. | | |
|---|---|---|---|
| | 1 | 3 | 23 |
| KA | 1.00000000E+00 | 1.00000000E+00 | 1.00000000E+00 |
| A3 | 0.00000000E+00 | 0.00000000E+00 | 0.00000000E+00 |
| A4 | 5.18882505E−06 | −5.14249825E−06 | −5.25532447E−07 |
| A5 | 0.00000000E+00 | 0.00000000E+00 | 0.00000000E+00 |
| A6 | −3.23450934E−09 | 5.12834157E−11 | 8.34301502E−10 |
| A7 | 0.00000000E+00 | 0.00000000E+00 | 0.00000000E+00 |
| A8 | 1.98740330E−12 | 1.14153099E−12 | −4.93172362E−12 |
| A9 | 0.00000000E+00 | 0.00000000E+00 | 0.00000000E+00 |
| A10 | −6.83584428E−16 | −3.42331893E−16 | 1.06735795E−14 |
| A11 | 0.00000000E+00 | 0.00000000E+00 | 0.00000000E+00 |
| A12 | 1.14552162E−19 | −1.12891019E−21 | −7.89012953E−18 |
| A13 | 0.00000000E+00 | 0.00000000E+00 | 0.00000000E+00 |
| A14 | 0.00000000E+00 | 0.00000000E+00 | 0.00000000E+00 |
| A15 | 0.00000000E+00 | 0.00000000E+00 | 0.00000000E+00 |
| A16 | 0.00000000E+00 | 0.00000000E+00 | 0.00000000E+00 |
| A17 | 0.00000000E+00 | 0.00000000E+00 | 0.00000000E+00 |
| A18 | 0.00000000E+00 | 0.00000000E+00 | 0.00000000E+00 |
| A19 | 0.00000000E+00 | 0.00000000E+00 | 0.00000000E+00 |
| A20 | 0.00000000E+00 | 0.00000000E+00 | 0.00000000E+00 |

In addition, Table 29 shows values corresponding to Conditional Formulae (1) through (4) for Examples 1 through 7. Note that all of the Examples use the d line as a reference wavelength, and the values shown in Table 29 are those with respect to the reference wavelength.

TABLE 29

| Formula | Conditional Formula | Example 1 | Example 2 | Example 3 | Example 4 | Example 5 | Example 6 | Example 7 |
|---|---|---|---|---|---|---|---|---|
| (1) | $h/(Yimg \times \tan\theta)$ | 2.12 | 2.06 | 2.23 | 2.27 | 2.28 | 2.21 | 1.79 |
| (2) | n1a | 1.663 | 1.663 | 1.620 | 1.575 | 1.565 | 1.657 | 1.807 |
| (3) | f13/f1 | 2.59 | 2.66 | 2.64 | 2.78 | 2.73 | 2.28 | 2.85 |
| (4) | f11/Yimg | −1.89 | −1.85 | −1.68 | −1.68 | −1.69 | −1.84 | 1.79 |

Based on the data above, all of the zoom lenses of Examples 1 through 6 satisfy Conditional Formulae (1) through (4), and the zoom lens of Example 7 satisfies Conditional Formulae (1), (3), and (4). Therefore, it can be understood that these zoom lenses are high performance zoom lenses having wide angles of view, while being compact and lightweight.

Figure 16:
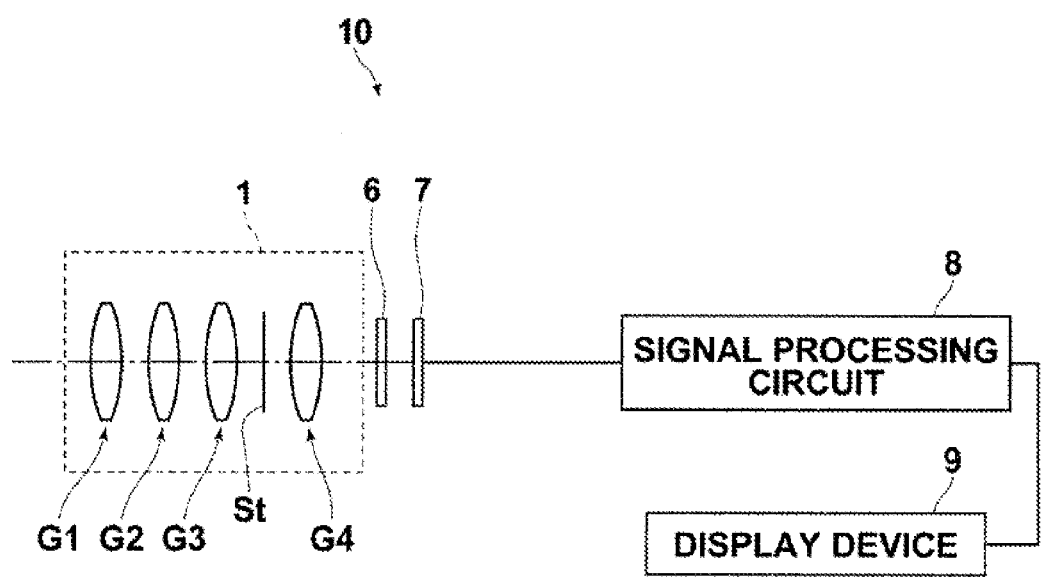
FIG. 16 is a schematic diagram that illustrates the configuration of an imaging apparatus according to an embodiment of the present invention.

Next, an imaging apparatus according to an embodiment of the present invention will be described. FIG. 16 is a schematic diagram that illustrates the configuration of an imaging apparatus equipped with a zoom lens according to an embodiment of the present invention as an example of an imaging apparatus according to the embodiment of the present invention. Note that FIG. 16 schematically illustrates each of the lens groups. Examples of this imaging apparatus include a video camera and an electronic still camera having a solid state imaging element such as a CCD and a CMOS as a recording medium.

The imaging apparatus 10 illustrated in FIG. 16 is equipped with an imaging lens 1, a filter 6 that functions as a low pass filter or the like, provided toward the image side of the imaging lens 1, an imaging element 7 provided toward the image side of the filter 6, and a signal processing circuit 8. The imaging element 7 converts optical images formed by the imaging lens 1 into electrical signals. A CCD (Charge Coupled Device) or a CMOS (Complementary Metal Oxide Semiconductor) may be employed as the imaging element 7, for example. The imaging element 7 is provided such that the imaging surface thereof is positioned at the image formation plane of the imaging lens 1.

Images obtained by the imaging lens 1 are formed on the imaging surface of the imaging element 7. Output signals from the imaging element 7 related to the images undergo calculation processes at the signal processing circuit 8, and the images are displayed by a display device 9.

The present invention has been described in connection with the embodiments and the Examples. However, the zoom lens of the present invention is not limited to the embodiments and Examples described above, and various modifications are possible. For example, the values of the radii of curvature, the distances among surfaces, and the refractive indices, etc., of each lens component are not limited to the numerical values indicated in connection with the Examples, and may be other values.

What is claimed is:

1. A zoom lens, comprising:
a first lens group having a positive refractive power which is fixed while changing magnification;
two or more movable lens groups that move independently from each other while changing magnification; and
a final lens group having a positive refractive power which is fixed while changing magnification, provided in this order from an object side;
the zoom lens satisfying Conditional Formula (1) below:

$$1.30 < h/(Yimg \cdot \tan\theta) < 2.37 \qquad (1)$$

wherein h is the height at which a chief ray of light having a maximum image height enters a first surface at a wide angle end, Yimg is the maximum image height, and θ is the half angle of view at the wide angle end.

2. A zoom lens as defined in claim 1, wherein:
the first lens group comprises an eleven lens group having a negative refractive power, a twelve lens group having a positive refractive power, and a thirteen lens group having a positive refractive power; and
the twelve lens group moves to perform focusing operations.

3. A zoom lens as defined in claim 2 that satisfies Conditional Formula (3) below:

$$1.95 < f13/f1 < 3.00 \qquad (3)$$

wherein f1 is the focal length of the first lens group, and f13 is the focal length of the thirteen lens group.

4. A zoom lens as defined in claim 2 that satisfies Conditional Formula (4) below:

$$-2.20 < f11/Yimg < -1.50 \qquad (4)$$

wherein f11 is the focal length of the eleven lens group, and Yimg is a maximum image height.

5. A zoom lens as defined in claim 2, wherein:
the twelve lens group comprises two pairs of cemented lenses.

6. A zoom lens as defined in claim 5, wherein:
the two pairs of cemented lenses are a cemented lens formed by a positive lens and a negative lens, and a cemented lens formed by a negative lens and a positive lens, provided in this order from the object side.

7. A zoom lens as defined in claim 2 that satisfies Conditional Formula (2-1) below:

$$1.530 < n1a < 1.665 \qquad (2\text{-}1)$$

wherein n1a is the average refractive index of the eleven lens group with respect to the d line.

8. A zoom lens as defined in claim 2 that satisfies Conditional Formula (3-1) below:

$$2.10 < f13/f1 < 2.90 \qquad (3\text{-}1)$$

wherein f1 is the focal length of the first lens group, and f13 is the focal length of the thirteen lens group.

9. A zoom lens as defined in claim 2 that satisfies Conditional Formula (3-2) below:

$$2.20 < f13/f1 < 2.80 \qquad (3\text{-}2)$$

wherein f1 is the focal length of the first lens group, and f13 is the focal length of the thirteen lens group.

10. A zoom lens as defined in claim 2 that satisfies Conditional Formula (4-1) below:

$$-2.10 < f11/Yimg < -1.60 \qquad (4\text{-}1)$$

wherein f11 is the focal length of the eleven lens group, and Yimg is a maximum image height.

11. A zoom lens as defined in claim 2 that satisfies Conditional Formula (4-2) below:

$$-2.00 < f11/Yimg < -1.65 \qquad (4\text{-}2)$$

wherein f11 is the focal length of the eleven lens group, and Yimg is a maximum image height.

12. A zoom lens as defined in claim 1, wherein:

a second lens group having a negative refractive power and a third lens group having a negative refractive power are provided in this order from the object side as the movable lens groups.

13. A zoom lens as defined in claim 1, wherein:

a second lens group having a negative refractive power, a third lens group having a positive refractive power, and a fourth lens group having a negative refractive power are provided in this order from the object side as the movable lens groups.

14. A zoom lens as defined in claim 1 that satisfies Conditional Formula (1-1) below:

$$1.70 < h/(Yimg \cdot \tan \theta) < 2.37 \quad (1\text{-}1)$$

wherein h is the height at which a chief ray of light having a maximum image height enters a first surface at a wide angle end, Yimg is the maximum image height, and θ is the half angle of view at the wide angle end.

15. An imaging apparatus equipped with the zoom lens defined in claim 1.

16. A zoom lens, comprising:

a first lens group having a positive refractive power which is fixed while changing magnification;

two or more movable lens groups that move independently from each other while changing magnification; and a final lens group having a positive refractive power which is fixed while changing magnification, provided in this order from an object side;

the first lens group comprising an eleven lens group having a negative refractive power, a twelve lens group having a positive refractive power, and a thirteen lens group having a positive refractive power;

the twelve lens group moving to perform focusing operations; and the zoom lens satisfying Conditional Formula (2) below:

$$1.530 < n1a < 1.670 \quad (2)$$

wherein n1a is the average refractive index of the eleven lens group with respect to the d line, wherein, a second lens group having a negative refractive power and a third lens group having a negative refractive power are provided in this order from the object side as the movable lens groups.

17. A zoom lens as defined in claim 16 that satisfies Conditional Formula (3) below:

$$1.95 < f13/f1 < 3.00 \quad (3)$$

wherein f1 is the focal length of the first lens group, and f13 is the focal length of the thirteen lens group.

18. A zoom lens as defined in claim 16 that satisfies Conditional Formula (4) below:

$$-2.20 < f11/Yimg < -1.50 \quad (4)$$

wherein f11 is the focal length of the eleven lens group, and Yimg is a maximum image height.

19. An imaging apparatus equipped with the zoom lens defined in claim 16.

\* \* \* \* \*